(12) United States Patent
Powers et al.

(10) Patent No.: US 11,741,416 B2
(45) Date of Patent: Aug. 29, 2023

(54) ASSISTED ANALYTICS

(71) Applicant: Dimensional Insight Incorporated, Burlington, MA (US)

(72) Inventors: Frederick A. Powers, Sudbury, MA (US); James Clark, Andover, MA (US)

( * ) Notice: Subject to any disclaimer, the term of this patent is extended or adjusted under 35 U.S.C. 154(b) by 0 days.

(21) Appl. No.: 17/504,896

(22) Filed: Oct. 19, 2021

(65) Prior Publication Data

US 2022/0108255 A1   Apr. 7, 2022

Related U.S. Application Data

(63) Continuation of application No. 16/510,327, filed on Jul. 12, 2019, now Pat. No. 11,188,865.

(60) Provisional application No. 62/851,428, filed on May 22, 2019, provisional application No. 62/697,737, filed on Jul. 13, 2018.

(51) Int. Cl.
*G06Q 10/0639* (2023.01)
*G06F 16/2457* (2019.01)

(52) U.S. Cl.
CPC .  *G06Q 10/06393* (2013.01); *G06F 16/24578* (2019.01)

(58) Field of Classification Search
CPC ............ G06Q 10/00–50/00; G06F 1/00–40/00
USPC ................................. 705/7.11–7.42
See application file for complete search history.

(56) References Cited

U.S. PATENT DOCUMENTS 5,283,399 A    2/1994  Fujino et al.
6,499,017 B1  12/2002  Feibelman et al.
7,356,430 B2 *  4/2008  Miguelanez .......... G06F 11/273
                                                      702/108
7,761,480 B2   7/2010  Toledano et al.
8,170,975 B1   5/2012  Qureshi et al.
8,732,213 B2   5/2014  Sowell et al.
8,832,020 B2   9/2014  Landy et al.
(Continued)

FOREIGN PATENT DOCUMENTS

WO          2015136395 A1     9/2015

OTHER PUBLICATIONS

Cheng, Edmond , "Integrating Data and Business Rules with a Control Data Set in SAS", CACI International Inc., Paper 3461-2015, 2015, pp. 1-11.
(Continued)

*Primary Examiner* — Alan S Miller
(74) *Attorney, Agent, or Firm* — NextWave IP Legal; Leon Fortin, Jr.

(57) ABSTRACT

Assisted analytics, facilitates responding to a user selection of a measure that is calculated from a data set that is characterized by a plurality of dimensions of data, populating, with a processor a set of dimensions of the data with dimensions that contribute at least one data value to the user selected measure by calculating, for each dimension of the data in the set of dimensions of data a measure outlier threshold for a set of timeframe-specific values of the measure. This outlier threshold is applied, for each dimension of the data in the set of dimensions of data to calculate a dimension-specific outlier factor by aggregating timeframe-specific outlier weights for each timeframe in which a timeframe-specific value in the set of timeframe-specific values exceeds the measure outlier threshold. The results of this aggregation can be displayed in a ranked list of dimensions based on the dimension-specific outlier factor.

20 Claims, 34 Drawing Sheets

(56) References Cited

U.S. PATENT DOCUMENTS

| | | |
|---|---|---|
| 9,087,138 B2 | 7/2015 | Zhou |
| 9,208,212 B2 | 12/2015 | Niehoff et al. |
| 10,445,674 B2 | 10/2019 | Clark et al. |
| 10,467,550 B1 | 11/2019 | Gupta et al. |
| 10,671,956 B2 | 6/2020 | Clark et al. |
| 10,839,327 B2 | 11/2020 | Clark et al. |
| 11,164,131 B2 | 11/2021 | Clark et al. |
| 11,188,865 B2 | 11/2021 | Powers et al. |
| 2002/0049740 A1* | 4/2002 | Arning ................ G06F 16/35 |
| 2002/0107858 A1* | 8/2002 | Lundahl ............... G06F 18/23 |
| 2003/0150908 A1* | 8/2003 | Pokorny .......... G05B 13/0285 |
| | | 235/375 |
| 2003/0233197 A1* | 12/2003 | Padilla ................ G16B 25/00 |
| | | 702/179 |
| 2004/0039968 A1* | 2/2004 | Hatonen ............. G06N 20/00 |
| | | 714/39 |
| 2005/0278597 A1* | 12/2005 | Miguelanez ...... G05B 23/0229 |
| | | 714/E11.17 |
| 2006/0010439 A1 | 1/2006 | Majidian |
| 2006/0111844 A1* | 5/2006 | Chandler ............. G06F 17/18 |
| | | 702/1 |
| 2007/0033158 A1* | 2/2007 | Gopalan ............. G16B 25/00 |
| 2008/0295069 A1 | 11/2008 | Nicholls et al. |
| 2009/0144217 A1 | 6/2009 | Bergsten et al. |
| 2009/0287694 A1* | 11/2009 | McGowan ......... G06F 16/288 |
| | | 707/999.005 |
| 2010/0017009 A1* | 1/2010 | Baseman .......... G05B 19/0428 |
| | | 700/109 |
| 2011/0153270 A1* | 6/2011 | Hoffman ........... G06F 18/2433 |
| | | 702/179 |
| 2011/0178967 A1* | 7/2011 | Delp .................. G06F 11/2263 |
| | | 706/20 |
| 2012/0023050 A1* | 1/2012 | Georgopoulos ....... G16H 50/70 |
| | | 706/20 |
| 2012/0082304 A1 | 4/2012 | Byrne et al. |
| 2013/0046569 A1 | 2/2013 | Miller et al. |
| 2013/0165238 A1 | 6/2013 | Batista |
| 2013/0275612 A1 | 10/2013 | Voss et al. |
| 2015/0019516 A1 | 1/2015 | Wein et al. |
| 2015/0205827 A1* | 7/2015 | Sengupta ............... G06Q 30/02 |
| | | 707/690 |
| 2015/0206055 A1* | 7/2015 | Sengupta ................ G06N 5/04 |
| | | 706/46 |
| 2017/0104657 A1* | 4/2017 | Gopalakrishnan .... G06F 18/232 |
| 2017/0199902 A1* | 7/2017 | Mishra .................... G06N 5/01 |
| 2017/0270452 A1 | 9/2017 | Clark et al. |
| 2018/0121853 A1 | 5/2018 | Clark et al. |
| 2018/0121854 A1 | 5/2018 | Clark et al. |
| 2018/0121855 A1 | 5/2018 | Clark et al. |
| 2018/0181897 A1 | 6/2018 | Clark et al. |
| 2018/0225027 A1* | 8/2018 | Cooke ................. G06F 3/04842 |
| 2020/0012986 A1 | 1/2020 | Clark et al. |
| 2020/0019911 A1 | 1/2020 | Powers et al. |

OTHER PUBLICATIONS

Miatei, Gheorghe, "Column Oriented Databases, an Alternative for Analytical Environment", Database Systems Journal, vol. I, No. 2, 2010, pp. 3-16.

* cited by examiner

| Charge ID | Account ID | Posting Date | Revenue Code | Charge |
|---|---|---|---|---|
| T_01 | A_01 | 2016/01/05 | 450 | 123.50 |
| T_02 | A_01 | 2016/01/05 | 110 | 40.50 |
| T_03 | A_02 | 2016/01/09 | 110 | 78.90 |
| T_04 | A_02 | 2016/01/09 | 110 | 10.00 |
| T_05 | A_02 | 2016/01/09 | 110 | -88.90 |
| T_06 | A_03 | 2016/02/04 | 170 | 56.70 |
| T_07 | A_03 | 2016/02/06 | 110 | 405.00 |
| T_08 | A_03 | 2016/02/06 | 110 | 12.25 |
| T_09 | A_04 | 2016/02/07 | 450 | 145.20 |
| T_10 | A_05 | 2016/03/18 | 110 | 0.00 |
| T_11 | A_05 | 2016/03/18 | 110 | 88.80 |
| T_12 | A_06 | 2016/04/01 | 170 | 101.80 |
| T_13 | A_06 | 2016/04/03 | 170 | 102.80 |
| T_14 | A_06 | 2016/04/05 | 110 | 103.80 |
| T_15 | A_07 | 2016/04/21 | 110 | 15.80 |
| T_16 | A_07 | 2016/04/22 | 450 | 421.00 |
| T_17 | A_07 | 2016/04/22 | 110 | -15.80 |
| T_18 | A_08 | 2016/04/27 | 110 | 70.50 |
| T_19 | A_08 | 2016/04/30 | 110 | 82.60 |
| T_20 | A_08 | 2016/05/01 | 110 | 123.80 |
| T_21 | A_09 | 2016/05/03 | 450 | 82.10 |
| T_22 | A_09 | 2016/05/03 | 170 | 57.00 |
| T_23 | A_09 | 2016/05/03 | 170 | -57.00 |
| T_24 | A_09 | 2016/05/04 | 110 | 111.50 |
| T_25 | A_10 | 2016/05/13 | 110 | 60.50 |
| T_26 | A_10 | 2016/05/13 | 110 | 12.40 |

FIG. 11

| Account ID | Patient Type | Admit Date | Discharge Date |
|---|---|---|---|
| A_01 | Inpatient | 2016/01/05 | 2016/01/05 |
| A_02 | Outpatient | 2016/01/09 | 2016/01/09 |
| A_03 | Inpatient | 2016/02/04 | 2016/02/07 |
| A_04 | Inpatient | 2016/02/07 | 2016/02/07 |
| A_05 | Outpatient | 2016/03/18 | 2016/03/18 |
| A_06 | Inpatient | 2016/04/01 | 2016/04/05 |
| A_07 | Inpatient | 2016/04/21 | 2016/04/23 |
| A_08 | Inpatient | 2016/04/27 | 2016/05/02 |
| A_09 | Inpatient | 2016/05/03 | 2016/05/04 |
| A_10 | Inpatient | 2016/05/12 | |

FIG. 12

| Revenue Code | __mf_start_date | __mf_end_date | Revenue Description |
|---|---|---|---|
| 110 | | | Room & Board |
| 170 | | | Nursery |
| 450 | | | Emergency Room |

FIG. 13

| mf_key | mf_start_date | mf_end_date | Newborn Bed Charge |
|---|---|---|---|
| 110 | | | |
| 170 | | | Y |
| 450 | | | |

FIG. 14

| Dashboard Section | Category | Measure Name | Measure Description |
|---|---|---|---|
| Inpatient | Volumes | Acute Admissions | The sum of Admissions that are considered to be Acute. This does not include Normal Newborns or account types specified as Non-Acute. |
| Inpatient | Volumes | Non-Acute Admissions | The sum of Admissions designated as Non-Acute. Normal Newborns are not included as Non-Acute. |
| Inpatient | Volumes | Other Non-Acute Admissions | Admissions that should be excluded from Acute Admissions and not already defined by one of the other Non-Acute categories: Rehab, Psych & Hospice. |
| Inpatient | Volumes | Acute Discharges | The sum of Discharges that are considered to be Acute. This does not include Normal Newborns or account types specified as Non-Acute. An account must have a valid Discharge Date (non-blank, valid format & valid date) in order to be considered a discharge. |
| Inpatient | Volumes | Non-Acute Discharges | The sum of Discharges for Non-Acute patients |
| Inpatient | Volumes | Other Non-Acute Discharges | The sum of Discharges for other Non-Acute patients using the definitions outlined for Other Non-Acute Patients. |
| Inpatient | Volumes | Normal Newborns | The sum of Normal Newborns born in the hospital. |
| Inpatient | Volumes | Normal Newborn Discharges | The sum of Discharges for Normal Newborns using the definitions outlined for Normal Newborn. |
| Inpatient | Volumes | Acute Discharge Days | The sum of Discharge Days for Acute patients. |

1502 Dashboard Section, 1504 Category, 1506 Measure Name, 1508 Measure Description

FIG. 15

Total Admissions

Minimum ratings: 6

| Rating | Dimension | Rating Value | Chart |
|---|---|---|---|
| ⊚ | Admit Location | ⊚ GER<br>⊚ HER | ☑<br>☑ |
| ⊚ | Admitting Provider | ⊚ Cain, R (PHY_011323)<br>⊚ Russo, W (PHY_042235) | ☑<br>☑ |
| ⊚ | Financial Class | ⊚ Medicare | ☑ |
| ⊚ | MS DRG | ⊚ 470-MAJOR HIP AND KNEE JOINT REPLACEMENT OR REATTACHMENT OF LOWER EXTREMITY W/O MCC<br>⊚ 775-VAGINAL DELIVERY W/O COMPLICATING DIAGNOSES<br>⊚ 795-NORMAL NEWBORN<br>⊚ 392-ESOPHAGITIS, GASTROENT & MISC DIGEST DISORDERS W/O MCC | ☑<br>☑<br>☑<br>☑ |
| ⊚ | Principal Dx Clinical Class | ⊚ Liveborn (018) | ☑ |
| ⊚ | Principal Procedure | ⊚ 10E0XZZ - Delivery of Products of Conception, External Approach<br>⊚ 5A09357 - Assistance with Respiratory Ventilation, <24 Hrs, CPAP<br>⊚ 10D00Z1 - Extraction of Products of Conception, Low, Open Approach | ☑<br>☑<br>☑ |
| ⊚ | Principal Px Clinical Class | ⊚ Other procedures to assist delivery (137)<br>⊚ Respiratory intubation and mechanical ventilation (216) | ☑<br>☑ |
| ⊚ | Primary Care Provider | ⊚ Cantu, K (PHY_045093) | ☑ |
| ⊚ | Principal Px Provider Service | ⊚ OB/Gyn | ☑ |
| ⊚ | Discharge Status | ⊚ DC Discharge to Home(01) | ☑ |

EXIT ASSISTED ANALYSIS

ASSISTED ANALYTICS

CLAIM TO PRIORITY

This application is a continuation of U.S. patent application Ser. No. 16/510,327, filed Jul. 12, 2019, entitled "ASSISTED ANALYTICS".

U.S. patent application Ser. No. 16/510,327 claims the benefit of U.S. Provisional Patent Application No. 62/697,737, filed Jul. 13, 2018, entitled ASSISTED ANALYTICS, and claims the benefit of U.S. Provisional Patent Application No. 62/851,428, filed May 22, 2019, entitled ASSISTED ANALYTICS.

Each of the foregoing applications is incorporated herein by reference in its entirety for all purposes.

BACKGROUND

Facilities for providing assessment, feedback, and determining a source of substantive changes in business performance often require a high degree of expertise by a business analyst and programmers to generate performance measurement and analysis that meet the need of individuals within diverse organizations. Often, a result is little more than a rough guess that requires substantive manual investigation to track down sources of variance. Additionally, the bulk of the work required is rarely substantively transferrable to other use requirements and therefore presents an ongoing burden to organizations, and the like.

What is needed in the art is the ability to harness the power of computing devices to collect performance data from various sources, analyze the diversity of data presented, and intelligently report analytics that are not capable of being created by a human being or even teams of human beings. Such intelligent, comprehensive and automated analytics are one of several technologies provided in the present disclosure.

SUMMARY

At a top level, a measure may be any data indicator, variance of history of data points, identifying condition or data point (or collection of data points) that provides intelligence about a particular aspect of performance. A measure may also be the result of applying a mathematical expression to a collection of data records in one or more data sets. For example, a measure in the area of hospital operations may be the raw number of admissions of patients in a given month, or a measure may be the adjusted number of admissions given the number of days in that particular month, or a measure may be the calculated increase/decrease in comparison to the expected admissions/discharges, and the like.

A measure factory may be a computer-implemented technology, using one or more processors and associated peripherals (e.g., displays, storage devices, and the like), that can collect such performance measures from various data sources, analyze the measures, and report the measures in a comprehensive and automated manner that would be not be possible for individuals or teams of individuals to perform. For example, the measures contemplated to process and report may run in the tens of thousands for a single operation at a single location, much less millions or more measures that would be processed across an enterprise. And when harnessing the power of computers to perform these tasks, such processes and analyses can be completed remarkably fast, if not in real-time.

Assisted analytics circuits may be computer-implemented technologies using one or more processors and associated peripherals (e.g., displays, storage devices, and the like) that can produce, analyze, and recommend performance measures that indicate aspects of procedures and the like that are subject of the measures that represent outliers statically, by inference, and the like. Like the measure factory measures noted above, producing and analyzing measures, such as for the purpose of developing a deep identification of a procedure or source of performance variance, and identifying outliers thereof in a comprehensive and automated manner that would not be possible for individuals or teams of individuals to perform.

In embodiments, a computer-implemented method of assisted analytics, which may be implemented as an assisted analytics circuit and the like, may respond to a user selection of a measure that is calculated from a data set that is characterized by a plurality of dimensions of data by populating, with a processor, a set of analysis dimensions with dimensions of the data that contribute at least one data value to produce the user selected measure. In embodiments, the set of dimensions may be a subset of the plurality of dimensions of data. The method of assisted analytics may further use the processor to calculate a measure outlier threshold for a set of timeframe-specific values of the measure. In embodiments, the processor may calculate the measure outlier threshold for each dimension of the data in the set of dimensions of data. For each dimension of the data in the set of dimensions of data, the processor may calculate a dimension-specific outlier factor by aggregating timeframe-specific outlier weights for each timeframe in which a timeframe-specific value in the set of timeframe-specific values exceeds the measure outlier threshold. This aggregating may generate a weighted value (factor) for measures that are present in a given assisted analytics timeframe for each analysis dimension. In embodiments, the method may facilitate human access and viewing of the result of applying the method of assisted analytics by presenting in an electronic interface, the dimensions in the set of analysis dimensions of data in a ranked order that is based on the dimension-specific outlier factor. Thereby, for example, showing dimensions that have higher outlier impact above dimensions with lower outlier impact in a ranked order list. Other display types are possible, such as graphs, three or greater dimensional representations and the like.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIG. 11 depicts a table that represents a charges data set.

FIG. 12 depicts a table that represents an account data set.

FIG. 13 depicts a table that represents data used by a lookup factory rule.

FIG. 14 depicts a table that represents a data set used by a flag factory rule.

FIG. 15 depicts a table that represents measure configuration and description information.

FIG. 31 depicts a user selection of a dimension-value from the user interface of FIG. 29.

FIG. 33 depicts a result of assisted analysis of data presented in FIG. 32.

FIG. 34 depicts a list of dimension-values for the selected dimension-value of FIG. 31.

DETAILED DESCRIPTION

Figure 1:
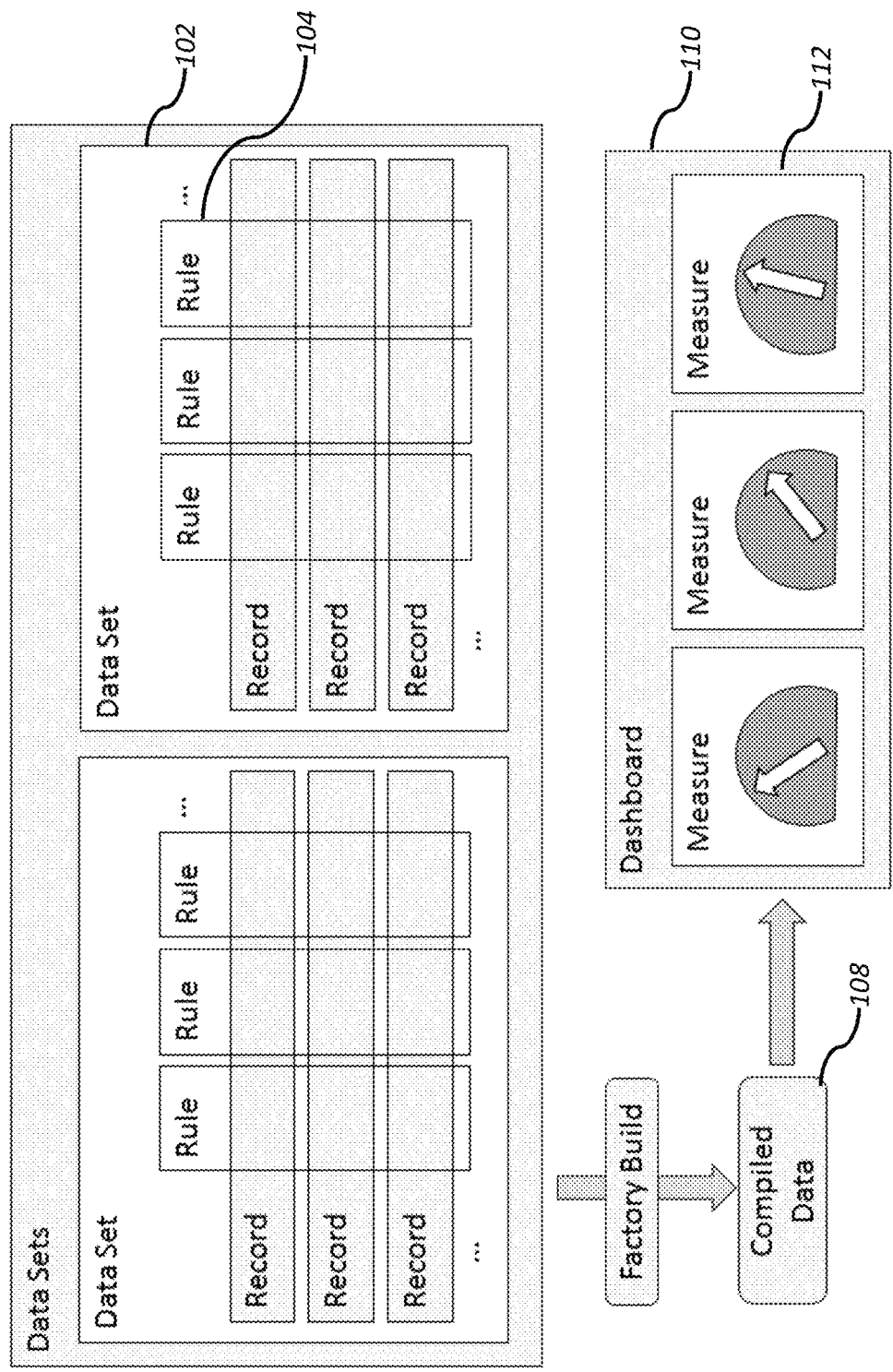
FIG. 1 depicts a diagram of elements of a measure factory.

Referring to FIG. 1, an embodiment of a measure factory, data sets, rules, measures and views are depicted. In embodiments, a data set 102 may be a collection of records, each of which may describe a particular kind of object, event, or relationship. Typically, data sets include data that represent some aspect of a business or business process. As an example, an "Accounts" data set may have records for individual accounts of a business (e.g., an account maybe associated with a customer or patient of the business); there may be one record for each such account.

Records in a data set may have a number of facts, or individual pieces of information, associated with them. Individual records may have certain kinds of facts that are unique to the record (e.g., a record identifier). However, other kinds of facts may be common to some or all of the records in the data set. For simplicity, each common type of fact is referred to herein as a source rule 104 of the data set. Generally, each source rule 104 is common to all records in a data set 102. As an example, the Accounts data set may have rules such as "Account ID", "Admit Date", "Purchase Date", and the like. The "Admit Date" rule may indicate an admission date type of fact for each record.

Goals of the measure factory methods and systems described herein includes adding new rules (new types of facts) to a collection of data sets, and making it easier to create and manage a large number of rules. The measure factory methods and systems described herein may automate the definition, generation, and processing of the rules, so the people working with the business data can focus on the correctness of the rules for generating meaningful measures, independent of the implementation of those rules, such as in terms of the requirements for preparing data for each rule and the flow of data from source data sets to final data sets.

One structural output of applying the measure factory methods and systems described herein may be a set of data structures, e.g. enhanced and newly created data tables 108 that support business-centric uses of the data. One such use may be an interactive electronic user interface or dashboard 110 for operating a portion of a business associated with the data in the data sets 102. As an example, data output by a measure factory may be displayed in summary form, such as depicting a number of Accounts with Admit Dates occurring this month. The summary form may be a single number, such as 286. The measure factory methods and systems described herein may summarize data in many ways. Each such way of summarizing data may be called a "measure" 112. A measure is typically the result of applying some mathematical expression to a specific set of rule values from a collection of records in one or more data sets.

Figure 2:
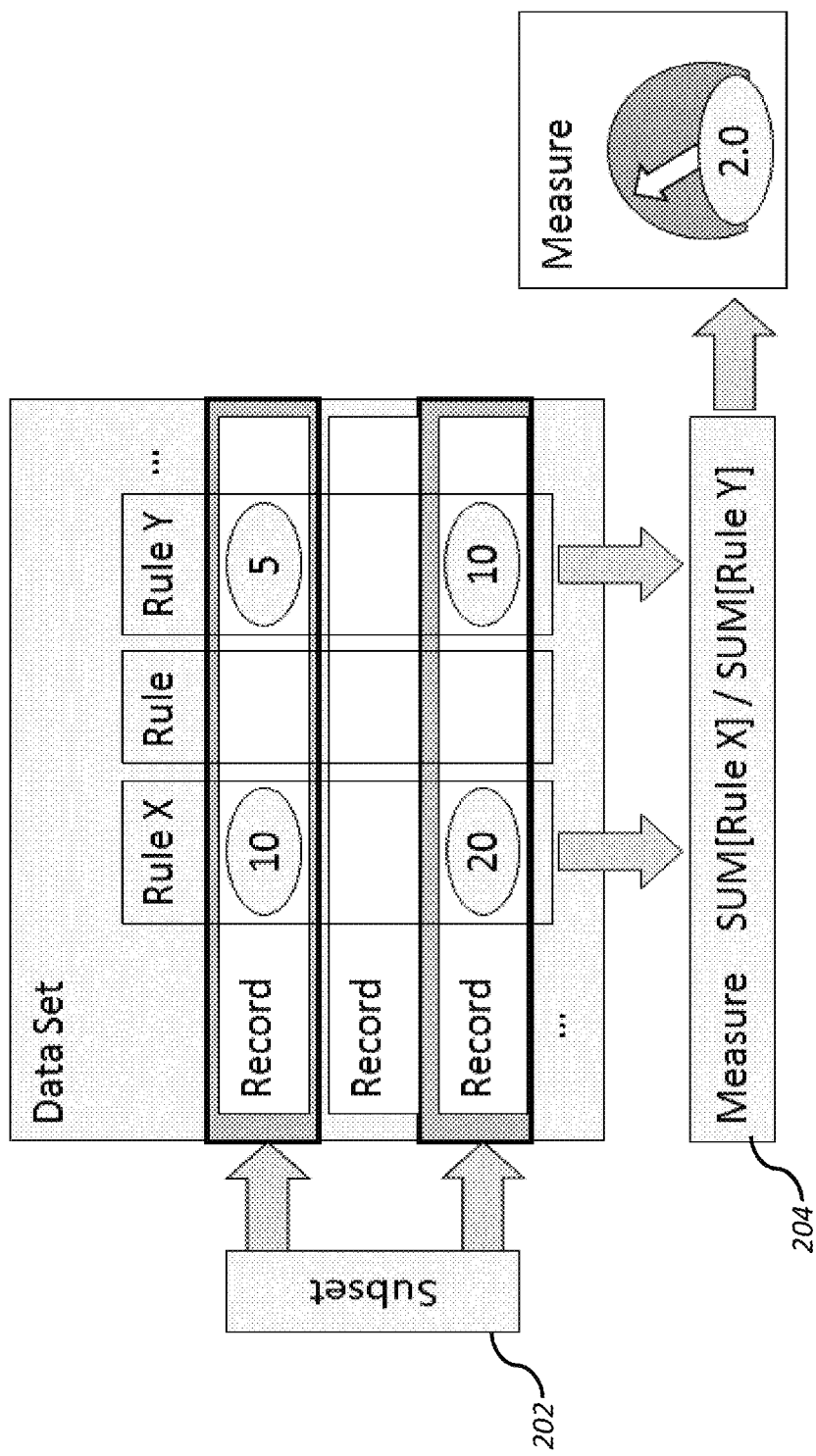
FIG. 2 depicts a diagram of data sets and rules of a measure factory.

Referring to FIG. 2 that depicts a diagram of data sets and rules of a measure factory, data sets 102 may be arranged as subsets of records. Subsets may be dynamically configured based on relationships of data in the records for specific rules. As an example, subset 202 comprising the first and third rows in the example embodiment of FIG. 2 may define data for rule X and rule Y that meet certain criteria, such as a non-zero value, a value relative to a threshold (e.g. above or below a threshold value) or relative to a set of thresholds (e.g. within or outside a range). A measure may result in a set of records from a data set, such as subset 202 being processed by a factory rule to produce a result, such as a summary, mathematical outcome, logical outcome and the like. In the example of FIG. 2, the measure 204 sums the values of records in subset 202 defined by rule x and divides that sum by the sum of values of records in subset 202 defined by rule y.

Measures may have associated data which helps to support rich displays, such as a description, a flag indicating whether the measures are "better" when it goes up or down relative to a prior time period or other measure, a set of preferred columns to access when analyzing the measure, and the like.

Measures may also be associated with a "view", which is an abstraction over the rules available in a data set. A view may assign specific rules to abstract rule concepts, to further separate a fact type from a corresponding rule. For instance, the abstract concept of "Date" may be specifically assigned to "Admit Date" for the "Admissions" measure, but it may be assigned to "Discharge Date" for the "Discharges" measure. This allows the dashboard to show the Admissions and Discharges measures together over a general time range (such as year-to-date), even though the two measures have a different concrete notion of which date rule is relevant to them.

More specifically, a view may be an abstraction of rules independent of what the underlying rule represents, e.g., different types of "date" can all be abstracted to a "date" view-level rule type. This way "admit date" and "discharge date" can both be treated as a "date" in a view-level "date" rule. As an example, a measure of admissions can reference a date value in admissions data set records. The date in these records would be an admission date. Similarly, a measure of discharges that accessed a data set of discharge records would reference the date in each record that would be a date of discharge. This is a simple abstraction example, but generally all rules to be abstracted to a view-level rule should be of the same general type (e.g., a date, a facility, a procedure or the like).

The measure factory methods and systems described herein may include different types of rules, such as source rules, factory rules, and the like. Exemplary types of rules are described in the following paragraphs and corresponding figures.

A first type of rule may be a source rule. Source rules may be associated with types or dimensions of data in a measure factory data set. As an example, a data set may be configured by extracting data from one or more external data stores, such as data stores, databases, data streams, and the like that may be associated with an aspect of a business for which the measure factory may be configured to analyze. A measure factory data set may preferably be configured as a columnar database (herein referred to as a cBASE). The columns in such a cBASE may be automatically made available as source rules in the data set. As source cBASE data sets are processed by the measure factory, other types of rules (e.g., additional columns) may be added. Although not intended to be limiting, processing of one or more data sets by the measure factory may be referred to herein as a "factory build".

In addition to source rules, there are several types of factory rules that may be referenced during the generation of a measure factory processing deployment. Such factory rules may be used to define measures by a person or may be automatically configured into a set of cohesive data processing measure factory data processing operations.

Figure 3:
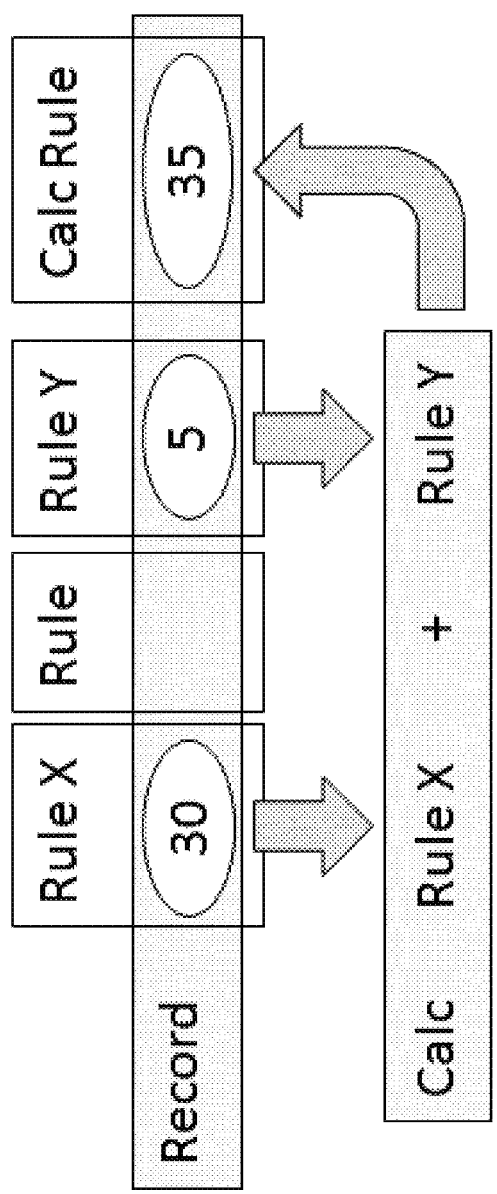
FIG. 3 depicts a calculation factory rule.

FIG. 3 depicts a first type of factory rule, specifically a calculation rule (herein referred to as a "calc" rule). A calc rule may generate new data that may be added to one or more of the records in a data set by applying one more mathematical expressions to data associated with existing rules in a data set. The use of a calc rule example of FIG. 3 defines a factory rule referred to as "Admission". This factory rule may be defined by a user as value("Patient Type")="Inpatient" and value("Admit Date") !=null. This could be interpreted as assigning a value to a new rule "Patient Type" for each processed record (e.g., adding this new rule as a new column to a cBASE data set, such as an Admissions data set). When the value of rule "Admit Date" is not null, the "PatientType" rule will be loaded with a value "Inpatient". A script or other data processing operation that could automatically be generated by the measure factory based on the factory rule definition above may simply be: calc-rule "Admission" 'value("Patient Type")="Inpatient" and value("Admit Date") !=null'. The result of such a rule may cause each processed record that has a non-null Admit Date value to be classifiable as an Inpatient record. The value "Inpatient" could be a binary value (e.g., 1 or 0, or may be a more involved value, such as a text string, formula, or the like).

Figure 4:
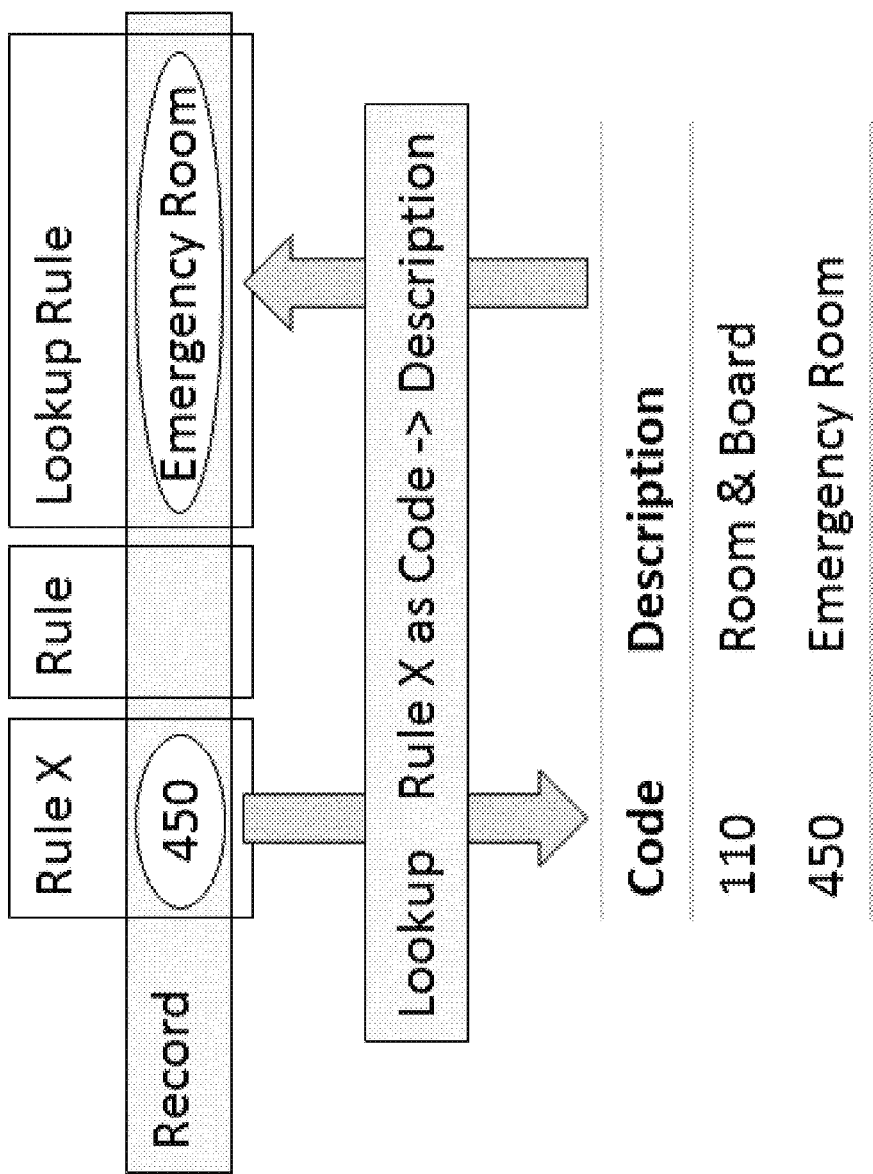
FIG. 4 depicts a lookup factory rule.

FIG. 4 depicts another type of factory rule that may perform data lookups for assigning one or more data values associated with one or more source rules into a group. A lookup rule may get information from a lookup file and may match certain values from certain rules in each processed record with values in the lookup table. The lookup table may be configured with a set of rows that include a lookup code that may be matched to the value of each processed data set record and a description value that may be added to each processed record in a new column associated with the rule for which the lookup is performed.

An exemplary use of a lookup rule is to convert codes into text descriptions. In the lookup factory rule example of FIG. 4, the lookup rule converts "Revenue Code" (depicted as "Rule X") to "Revenue Description" (depicted as "Lookup Rule"). A lookup file, would be accessed and the "Revenue Code" rule value in each processed cBASE record would be used as an index into the lookup file. A corresponding "Revenue Description" value in the lookup file would be placed in a "Revenue Description" column of the processed record. An automatically generated script to define such a rule might comprise: lookup "Revenue Descriptions" {date rule="Posting Date"; key "Revenue Code"; lookup-rule "Revenue Description" }.

In some cases, a lookup rule could be implemented as a calc rule, but lookups have advantages over plain calc rules. Lookups are easier to maintain. As an example of easier maintenance, one can modify the lookup values by editing the lookup table directory, and the lookup table can be generated by an external process. Lookup rules can also access an "effective date range" for each entry in the lookup table. Therefore, if a preferred mapping between an index and a description in the lookup table changes over time, the effective date range values in a lookup tale entry can reflect that change and return the mapped value appropriate to the time associated with the record. In an example, if Revenue Code 123 meant "Emergency Room—Other" for transactions that occurred before Jan. 1, 2015, but it meant "Urgent Care" for transactions on or after that date, then the lookup table can be set up to facilitate accessing the appropriate Revenue Code 123 for each execution of the measure factory. The effective date range may be matched to a target date range for the execution of the measure factory. In this way, the data added to the cBASE column for each processed record may correspond to a preferred effective date. Further in this example, a target date may be predefined, may be calculated by a factory rule, may be referenced in the processed record, and the like.

Figure 5:
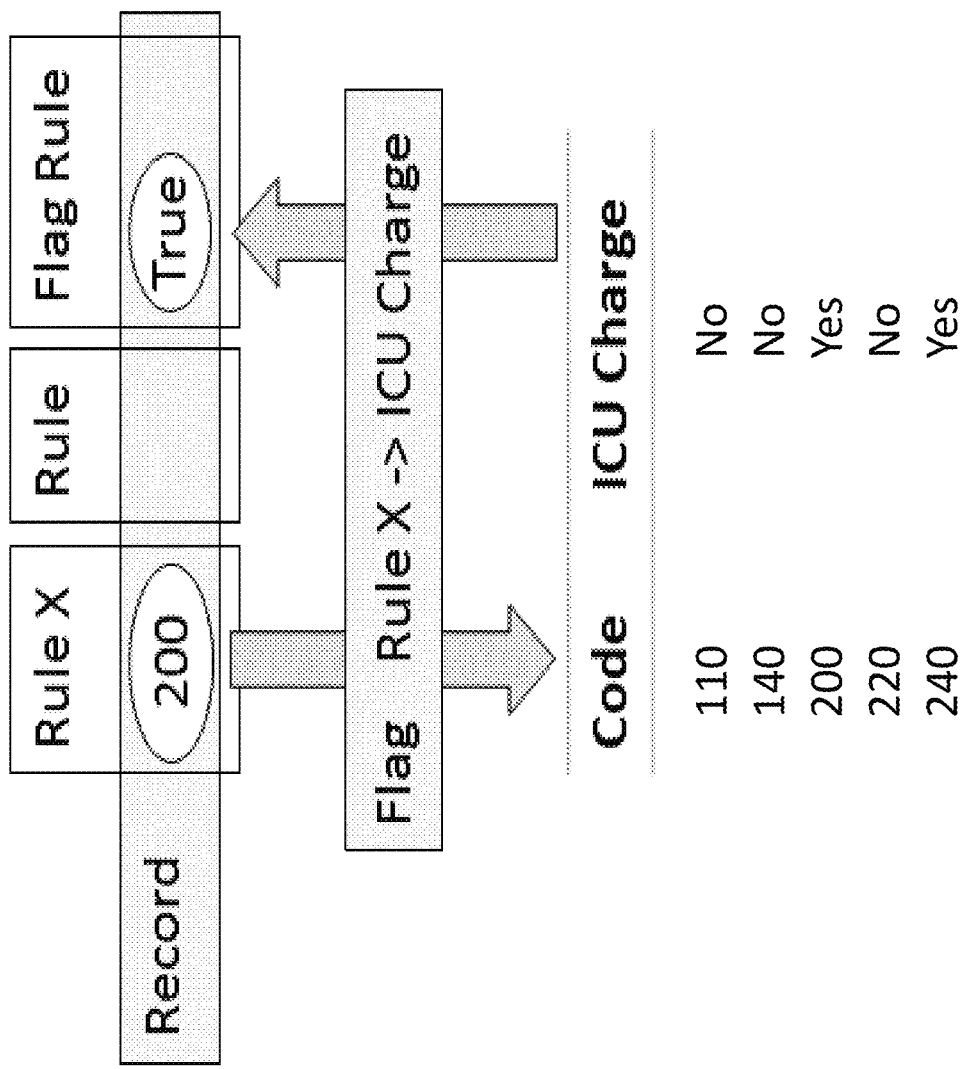
FIG. 5 depicts a flag factory rule.

Referring to FIG. 5, another factory rule is depicted for flagging certain records in the cBASE based on values in the record. Whereas a lookup rule can result in any string or other value being loaded to a cBASE column in each processed record in a data set based on other values in the record, a flag rule results in one of two values being added to the cBASE record. This rule is generally useful for mapping records, based on a select rule value (e.g., Revenue code) as either included or excluded from a particular set of records. In the example of FIG. 5, records with revenue code 110 are not included in an ICU charge group of records, whereas records with revenue code 200 are included. Additional entries in the flag table could allocate records with other revenue codes to be included or excluded from the ICU charge group. In this way, further processing can be based on whether the record is an ICU charge (included in the ICU charge group) or not (excluded from the ICU charge group).

An automatically generated script and/or other data processing operation for processing records with the flag rule of FIG. 5 may comprise: flag-table "Revenue Flags" {date rule="Posting Date"; key rule="Revenue Code"; flag-rule "ICU Charge" }. When this script or other data processing operation executes, Revenue Codes in processed records will be matched to the Revenue Flags file entries. Where there are matches, if the record value Posting Date is within the effective dates for the matched Revenue Flags file entry, a new value (e.g., true/false) will be added to the "ICU Charge" cBASE column in the processed record.

Figure 6:
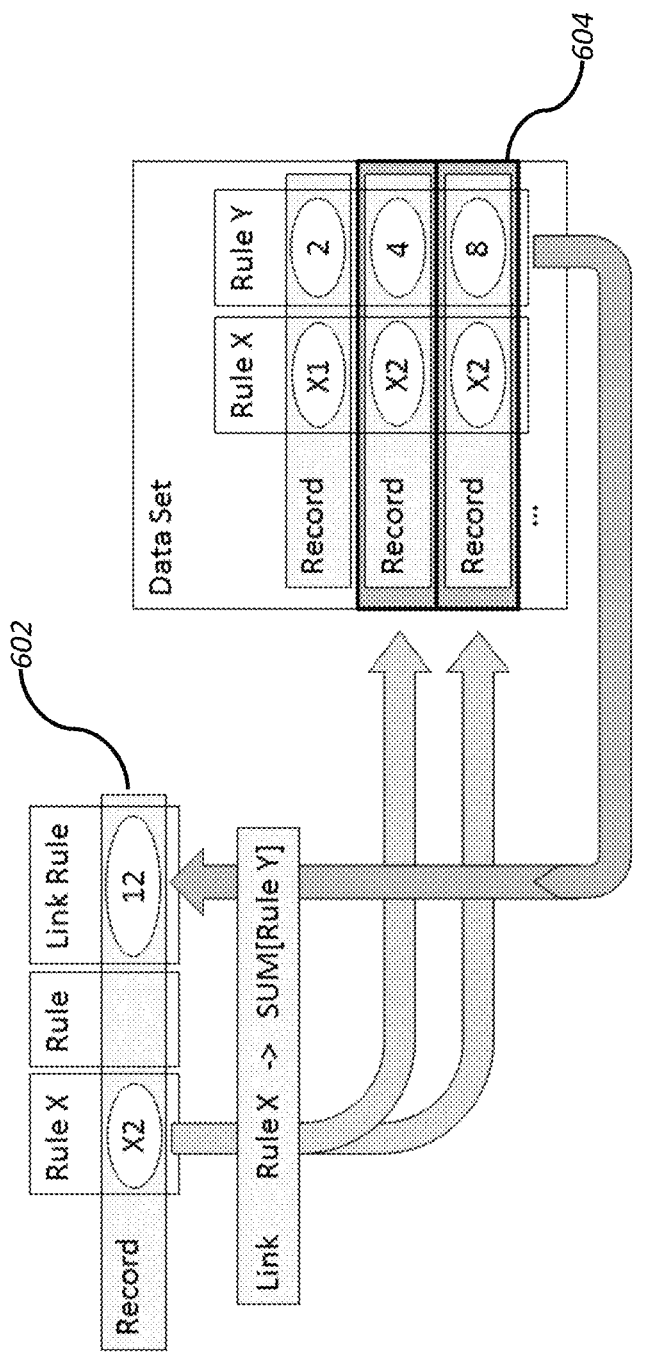
FIG. 6 depicts a link factory rule.

Referring to FIG. 6, a factory rule for linking data among data sets is depicted. A link rule may also be used to move or duplicate data from one data set to another. A link rule may use a "key", which may be a rule in an origin data set that is used to match data records for the corresponding rule in another data set herein called a matching data set. The link rule may facilitate connecting or associating records from the two data sets which share the same value for the selected key. As an example of a link rule key, both an Accounts (origin) and a Charges (matching) data set may have an "Account ID" rule in them. Data in the two data sets for records that have the same value in the "Account ID" rule (or column in a columnar data set) may be used in an operation associated with the link rule. The operation associated with the link rule, may include a summarizing mathematical expression that may be applied to the records in matching data set. The result of the expression may be placed in the corresponding record(s) in the origin data set. In the example of FIG. 6, an origin data set 602 includes a rule X that is used as a key for a link rule. A record in the origin data set 602 has a value of X2 for the key. This value X2 is used to find records in the matching data set 604 that have the same key value. An expression associated with the link rule causes other values in the matching records, such as by reciting an operation to perform on specific rules (e.g., Rule Y in FIG. 6) in the matching data set. The operation is performed on all records in the matching set that contain the key value. In the example of FIG. 6, the values in Rule Y of each corresponding record in the matching data set are summed. The result is loaded into a new link rule column in the appropriate record in the origin data set. In the example of FIG. 6, records in an Accounts data set will be updated with a total of charges found in the Charges data set for records in the Charge data set that match the Account ID of each record in the Accounts data set. This results in each Accounts record now including a total of charges for the account. While a summing expression is used in the example of FIG. 6, any logical, mathematical, or other expression may be used.

A script that may be automatically generated and executed by the measure factory for the link rule example of FIG. 6 may be: link "Charges" {key "Account ID"; link-rule "Has ICU Charge" 'count( )>0' filter='value("ICU Charge")'}. In this example, a default operation performed by the link rule is a mathematical summation of the ICU charges for each Account ID found in the Accounts data set.

Through the automated processing of factory rule definitions as described later herein, multiple-dependencies among data sets may be safely ignored by the user. The measure factory determines which rules (e.g., operations) must be performed to satisfy any cross-data set dependencies.

Figure 7:
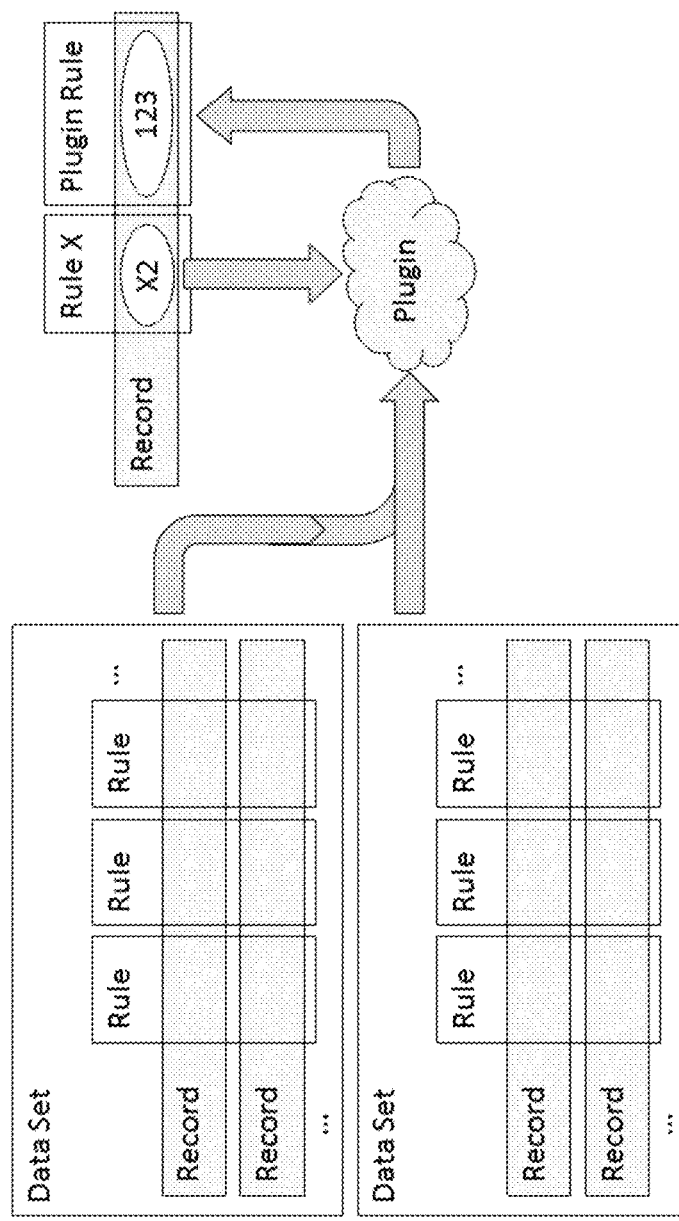
FIG. 7 depicts a plugin for use with a measure factory.

FIG. 7 depicts another type of factory rule that provides a rich data processing capability to a user without overly complicating the measure factory, specifically a plugin rule. As an example, a plugin rule is available to produce rules that are not possible using the other rule types. A plugin rule may execute an external process to determine the rule values, deliver data based on those values to the external process that performs operations with the delivered data from the data sets, and then join the result of that external process back into the data set(s). This allows the user to inject more complicated logic into the factory while still taking advantage of the measure factory's automatic management of the data flow.

As an example of a plugin rule, computing whether an Admission is a "Readmission" may need to determine if the current Admission encounter occurred within a certain number of days after a previous encounter of the same patient. This requires looking at data outside of each individual account record (e.g., prior account encounter records). A plugin rule can be defined to handle readmission calculations.

A readmission plugin rule may be configured by a user and the measure factory may automatically generate the following script for it: plugin "Readmission" {input "Accounts" {column "Account ID"; column "Admission"; column "Admit Date"; column "Discharge Date"; column "DRG"; column "MRN"} dimension "Account ID"; plugin-rule "Readmission" }.

A feature of a measure factory is its ability to automatically manage the application of rules, so that a user configuring the factory can focus on defining factory rules. The methods and systems of a measure factory free the user from needing to track when data that may be needed for a factory rule is ready for use. The measure factory isolates the user activity of defining rules from their processing.

A measure factory may process data using a "swim lane" method, embodiments of which are described in U.S. provisional patent application Ser. No. 62/301,136, the entirety of which is incorporated herein by reference. Each data set may be built up from a source table, rule by rule, until all rules are applied. The use of a swim lane analog is useful to visualize the rule execution hierarchy and overall data processing approach. All processing that can be performed on data in a data set without requiring access to other data sets (that may also be being processed) is performed within the swim lane of the data set, thereby providing independent processing of each data set in its own swim lane without affecting other data sets. Most of the time, a data set will stay in its swim lane, but for certain rule types (e.g., link and plugin) it may be necessary to transfer data from one lane to another.

Figure 8:
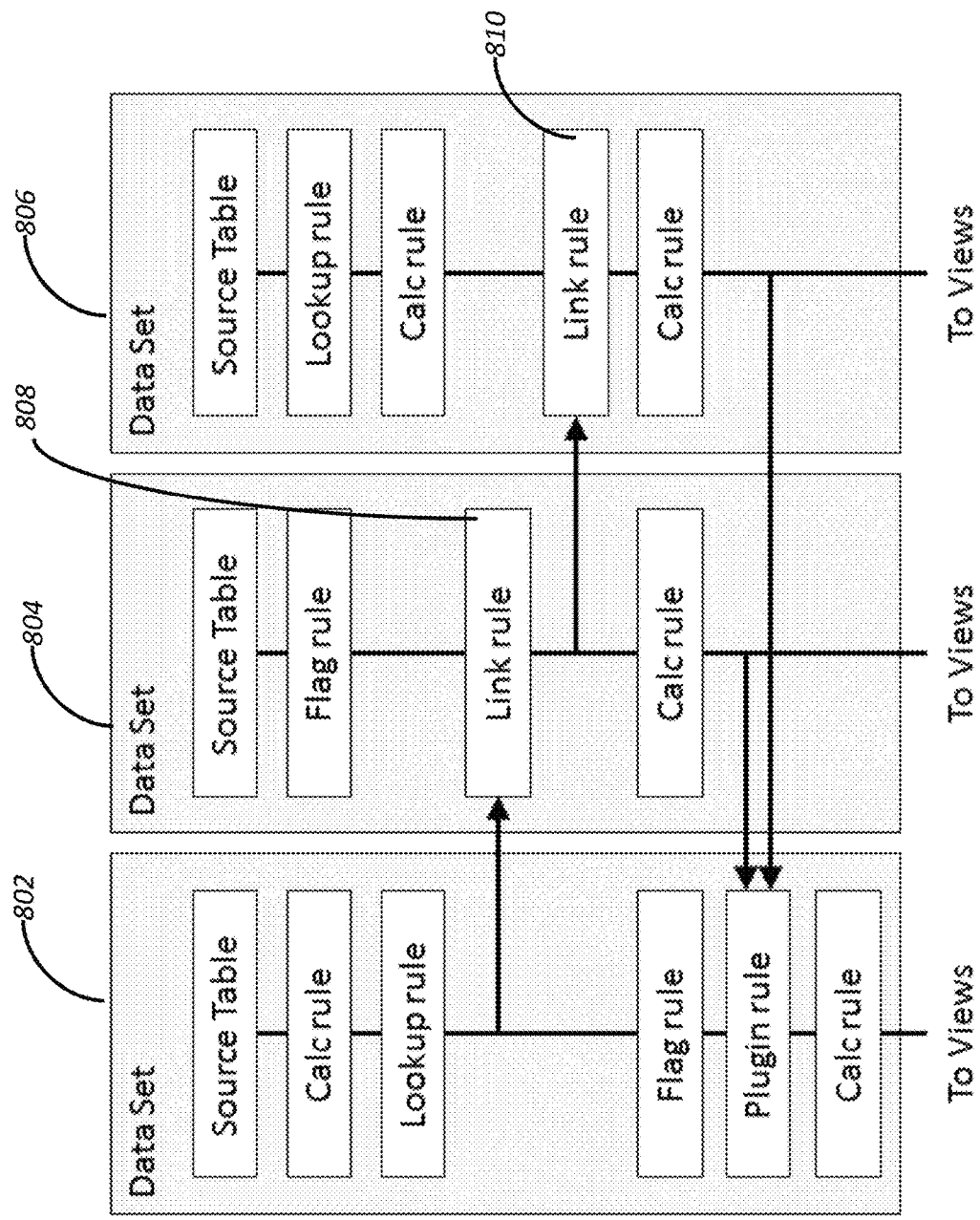
FIG. 8 depicts measure factory data set rule processing.

FIG. 8 depicts an embodiment of a measure factory data flow process for three data sets (802, 804, 806). A data set 802 performs a calc factory rule and a lookup factory rule before pausing processing to provide data to a link rule 808 operating on a data set, such as in a script for data set 804. The data set 802 rules processing continues once the lookup rule is complete. A measure factory processing function, such as a script for processing the data set 802 resumes by processing a flag rule and then executing a plugin rule 808 for accessing data from the data sets 804 and 806. The rule processing function, such as the script of data set 802 finishes by executing a calc factory rule.

A measure factory may include a script for processing rules for the data set 804 that processes a flag rule followed by the link rule 808 through which it accesses summary data from data set 802 after completion of that data set's lookup rule. Processing may pause temporarily while the script for data set 806 processes a link rule 810 that accesses data from data set 804. Note that the data generated by the script for data set 804 may include summary data from data set 802 at the time that the link rule 810 in the script for data set 806 executes. In this way, the script for data set 806 is configured to execute its link rule 810 only after data in data set 804 includes the summary data generated from executing the link rule 808. While a user definition of the link rule 810 may require the summary, data generated by link rule 808 execution, the user does not have to explicitly recite that link rule 808 be performed before executing link rule 810. A measure factory automated script processing facility determines this dependency based on the link rule 810 definition, an understanding of the data in each of the data sets, link rule 808 definition and the like. This may, for example, be determined from a data graph derived from references to the data sets in the factory rules that may be generated by the measure factory, such as during generation of the scripts, or directly during processing of factory rules and the like.

Methods and systems of a measure factory as described herein may include execution of rules, and optionally a script of rules that may be automatically generated by the measure factory. This automated rule execution may involve executing a large number of rules across a large number of data sets. Rules may process data within a single data set or may require use of data from multiple data sets. A rule processing set may determine a general order or hierarchy of rule processing. One aspect of such a rule processing set is the notion that only rules for which data is available can be processed. This may be referred to herein as a rule being ready. Therefore, a rule is considered "ready" if it does not depend on a rule which hasn't yet been applied so that data required by rule is not yet available. The rule processing set facilitates only applying a rule until it is ready. The measure factory rule processing set indicates that all ready calc, flag, and lookup rules are to be processed in order. These rules would not be executed because they would not be ready if they require data output from any rule that has not yet executed. Therefore, an order of execution of calc, flag, and lookup rules are based on availability of data within the given data set. After applying all ready calc, flag, and lookup rules, a measure factory rule processing facility may process ready link and plugin rules. Processing continues by processing more calc, flag, and lookup rules that are ready that have not yet been executed. Execution of rules continue with this general hierarchy until all rules are complete.

Figure 9:
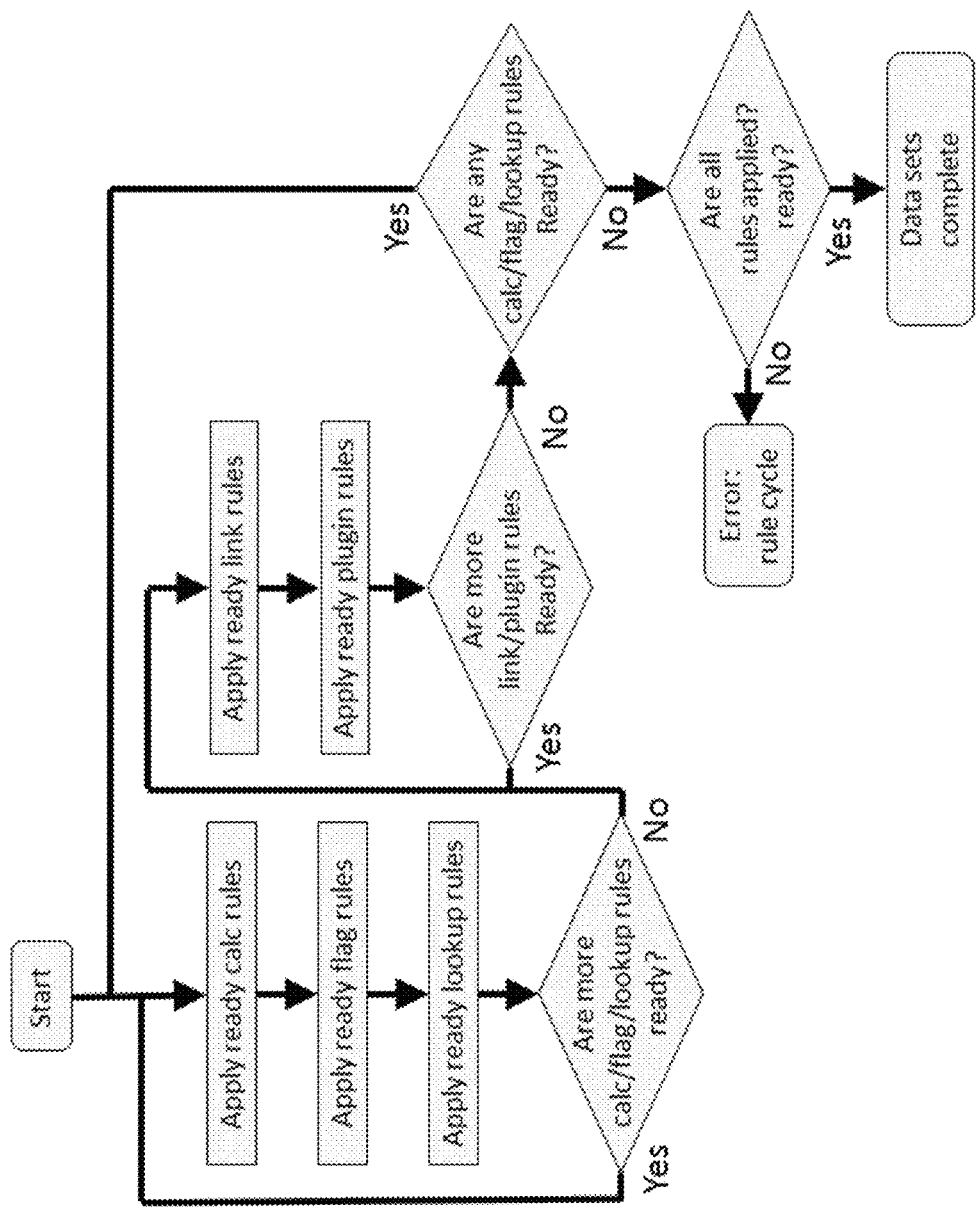
FIG. 9 depicts a flow chart of processing ready rules.

FIG. 9 depicts an exemplary flow of rule execution based on this measure factory rules processing set. All ready rules are executed across all data sets in an instance of measure factory rule processing so that at any time rules that do not depend on unavailable data may be executed. This facilitates highly efficient use of computer resources, scalability of the number of data sets, rules, and measures. It also facilitates use of distributed processing architectures and the like. Rules processing may, for example be distributed across networked processors so that data operations can be localized for data sets that are stored locally with each networked processor.

In embodiments, a columnar database processing engine referred to in U.S. patent application Ser. No. 15/164,546 the entirety of which is incorporated herein by reference as a Spectre data processing engine may be employed to perform one or more of the processing operations on the data sets, such as factory rules executions, script executions, and the like. In general, the Spectre data processing engine operates on and generates cBASE compatible columnar databases, such as the data sets described and used herein. Therefore, any reference to processing one or more data sets, such as with a measure factory script and the like may be performed by the Spectre data processing methods and systems described herein and/or incorporated herein by reference. Spectre provides specific benefits to a computer system operating the Spectre data processing engine. One such benefit is improvement of computer performance over prior art data processing engines due to the highly efficient computing technology that Spectre employs. Spectre works directly with columnar data bases such as a cBASE, which may be the data set used by the measure factory, thereby reducing the need for data translators, filters, scripts or other data computing tools to provide access to the data bases. In avoiding the need for such data translators, filters, scripts or tools, the reliability of the computer and system is improved while adding function and performance. Features associated with Spectre, such as a semantic knowledge plan that Spectre references and any other infrastructure on which Spectre is described as operating and/or that Spectre may reference or access in association with processing data sets is also incorporated herein by reference in its entirety. In embodiments one or more of the automatically generated measure factory scripts described herein may represent a Spectre compatible semantic knowledge plan. Alternatively, any arrangement of factory rules, source rules, and the like may represent a Spectre compatible semantic knowledge plan. Additionally, the highly efficient processing mechanisms utilized by Spectre including, for example, query optimization, machine code optimization, and execution may be used in any step of the measure factory script generation, factory rule execution, source rule execution, and data processing execution as appropriate. Further as noted in the documents referenced herein, the data sets, such as columnar data sets, described herein may be structured and/or optimized and/or tailored for efficient processing by a Spectre-like data processing engine. These aspects of the Spectre data processing engine are described here as examples of only some of the benefits and features of applying the Spectre data processing engine to measure factory operations. Any factory rule, source rule, script, and other data processing operations and the like available to the measure factory may be produced as machine-specific code that may facilitate execution at highly accelerated rates when compared to operation at a rule and/or script level. In embodiments, a Spectre-like data processing engine may execute machine-specific code, including optimizing scripts, rules and the like into machine-specific code for execution.

Figure 10:
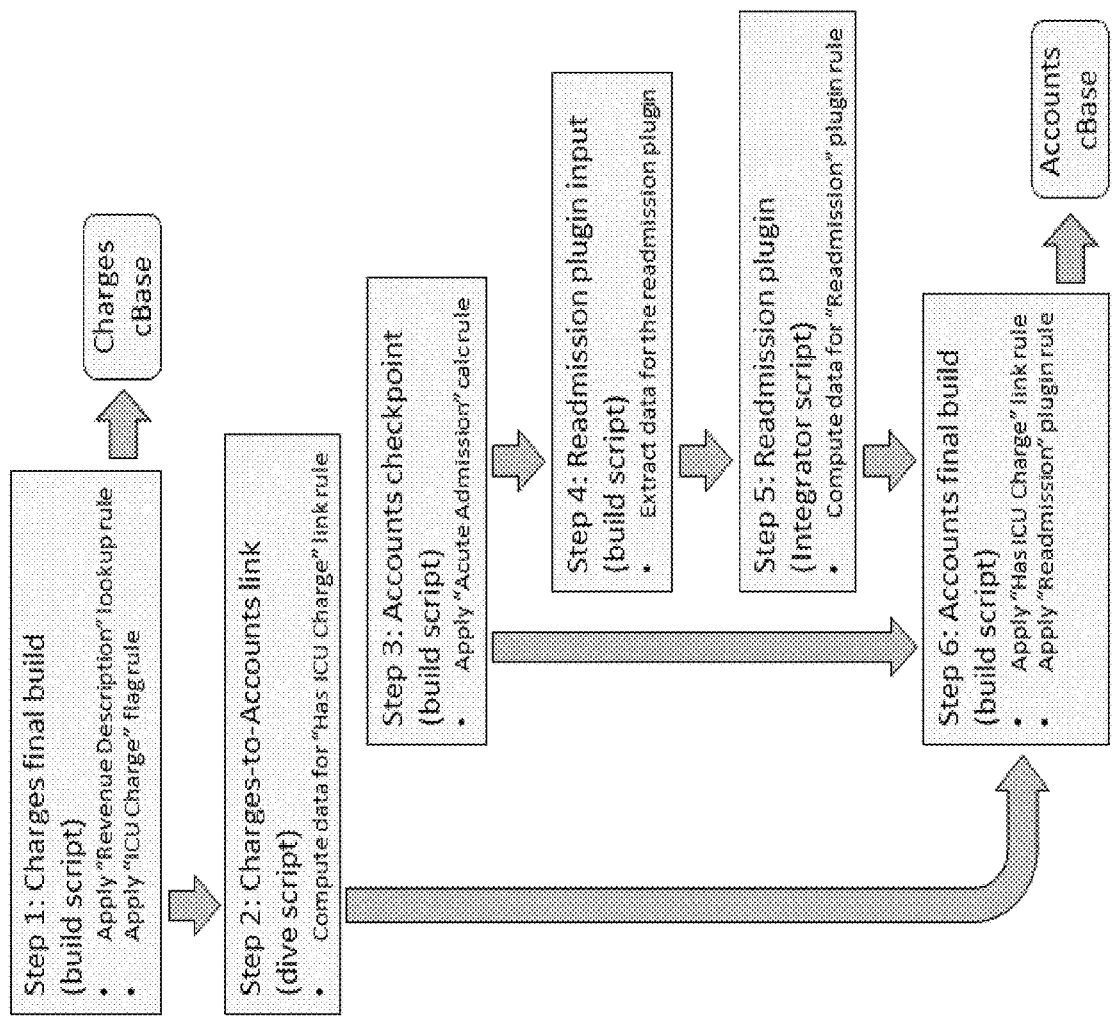
FIG. 10 depicts a measure factory embodiment for generating a charges cBASE and an Accounts cBASE.

FIG. 10 depicts an exemplary measure factory script processing flow to produce two cBASE compatible data sets, a Charges data set and an Accounts data set. References to "build script" and "dive script" may indicate types of Spectre-compatible scripts that may have syntax, structure, formatting, and the like that may benefit from the processing capabilities and optimizations of the Spectre data processing engine. Reference(s) to "integrator script" may indicate a script that performs an integration process, such as integrating data from multiple data sets and optionally other data sources. In general, references to scripts herein may be construed as any type of computer code, rule, and the like that facilitates execution according to the factory rules execution hierarchy and the like described herein, except where context indicates otherwise. As an example, FIG. 10 depicts measure factory processing flow to produce two cBASE compatible data sets. The processing flow may be captured as a script, such as a machine-specific set or code and/or any other structure that facilitates execution of factory rules and the like.

The individual user-defined or predefined factory rules may be combined and/or individually converted, via an automated script generation process, into one or more Script-compatible scripts, such as a build script. The automated script generation process will label a script as "checkpoint" if it produces an intermediate version of a cBASE. Likewise, an automatically generated script that produces a final version of a cBASE file may be labelled as "final". These labels, while useful for human inspection of scripts, may have no actionable attributes. On the other hand, during processing of a data set, any script that is labelled "checkpoint" will be processed by a Spectre-like data processing engine before processing a script labelled "final" to ensure proper integrity of the resulting data sets.

The Spectre technology may employ a combination of Spectre-compatible scripts for executing some factory rules, such as a link rule. In an example, of multi-script link rule processing, a dive-like script may be processed to summarize data from a matching data set (e.g., a data set that may have multiple records for each unique record in an origin data set). This dive-like script execution may be followed by execution of a build-like Spectre compatible script that joins the summarized data from the matching data set into the corresponding records in the origin data set.

The measure factory methods and systems may further improve computer performance by selectively eliminating certain calc output data columns from resulting cBASE data sets. In general, a measure factory produced cBASE data set will include a column for each rule processed during the factory operation on the data set. Generally, a cBASE data set produced by a measure factory execution will include the same number of records (e.g., rows) but more columns that the original source data set before being processed by the measure factory. However, calc factory rules that were not used by any other rule type are removed from the final cBASE file. This reduces memory requirements for storing and processing resulting cBASEs. It also improves data query performance by a combination of smaller data bases and use of the Spectre data processing engine's highly efficient columnar database processing capabilities. Performing a calc factory rule with a Spectre data processing engine at the time the data is needed results in an improvement in overall computer performance rather than increasing the size of the resulting cBASE to store the data for such calc rules.

FIGS. 11-14, depict measure factory data set tables from an exemplary use of the measure factory methods and systems described herein. FIG. 11 depicts a measure factory source data set for charges associated with transactions of a business, such as a hospital. The charges data set of FIG. 11 includes several source rules that are depicted as column headings in this columnar data set including Charge ID, Account ID, Posting Date, Revenue Code, and Charge. FIG. 12 depicts a measure factory accounts data set. This data set includes rules for Account ID, Patient Type, Admit Date, and Discharge Date. FIG. 13 depicts an exemplary lookup rule reference file that may be used to add a Revenue Description to another data set, such as the Charges data set of FIG. 11. In the table of FIG. 13, Revenue Descriptions may be established with an effectivity time-frame that may be defined by dates entered in the _mf_start_date and _mf_end_date columns for each entry. FIG. 14 depicts an exemplary flag rule table for determining which charges in the Charges data set of FIG. 11 are Newborn Bed Charges. In this example, Revenue Code may be used as a flag key. Charges with revenue code of 170 will be flagged as being a Newborn Bed Charge. Other revenue codes (e.g., 110 and 450) do not get flagged as Newborn Bed Charges in the Charges data set.

Measure factory methods and systems also include automatically generating data processing scripts based on user configured source files and factory rules. One potential approach for converting factory rules into scripts may include determining which data sets have the data required for executing each factory rule. Additionally, each factory rule may be evaluated to determine what data it will produce in each data set. If a factory rule generates a type of data that is not available in any source data set, but that is required by another factory rule, a dependency between the factory rules may be automatically established. This may be accomplished by generating a graph of where data for each factory rule comes from, what data needs to be populated in each data set, and what data needs to be present for generating final measures to be presented in a user interface, such as a dashboard of business performance measures, and the like. Optimization of all data paths throughout the execution of the measure factory instance is not necessary due to the highly efficient Spectre cBASE processing technology that is used to execute the generated scripts. Any given set of measure factory data sets may be processed dozens of times (perhaps 50 or more in some instances) through the measure factory execution of the factory rules, such as through execution of automatically generated measure factory scripts. The tradeoff of simplicity of user factory rule definition and script generation is worthwhile because of the efficiency of the Spectre data processing engine.

Configuring a measure factory may further include identifying the types of data to be presented in a user interface, dashboard, guided page and the like. Factory rules, source rules, dimensions of the data, and the like may be identified. These aspects may be used as a guide to generation of final cBASE data sets that will be used by the user interfaces, and the like.

Configuring a measure factory may further include identifying trends for measures that may be positive or negative. By defining a trend as positive, a dashboard for presenting measures corresponding to the trend may include an indicator that reflects the trend as positive or negative, rather than just as a numeric value. Referring again to FIG. 1, dashboard 110 presents measures as graphics that can reflect a value of a measure on a scale of measure values. Measure 112, for example, may include a variety of ranges for measures that can depict whether the measure represents a positive, neutral, or negative trend.

Referring to FIG. 15 that depicts a table that represents measure configuration and description information, various Inpatient measures for hospital operations are defined. Each measure may be associated with a portion of one or more measure factory dashboards as shown in the dashboards section 1502. Likewise, each measure may be associated with a category 1504. For convenient reference, each measure may be given a measure name 1506. A measure description 1508 may be included to provide a business-centric description of each measure that can be turned into a set of factory rules during a measure factory configuration process.

Figure 16:
FIG. 16 depicts a measure factory executive dashboard.

Referring to FIG. 16 that depicts a measure factory executive dashboard 1602 that provides information for a plurality of measures and with comparisons over various time frames. In the dashboard embodiment of FIG. 16, measures are presented in four categories 1604 with individual trend visual indications 1606, including color coding, such as green for changes over time that fit a preferred trend and red when a measure is following a trend that is not preferred. Additionally, data for a number of time frames 1608 and a visual indicator of the trend of the measure on a trend scale 1610. Measure configuration information and measure factory output data is referenced when generating such a dashboard. An indicator 1612 on the trend scale 1610 is automatically generated based on this information.

Figure 17:
FIG. 17 depicts a dashboard in a user interface of a measure factory for measures based on recent time periods.

Referring to FIG. 17 that depicts a current dashboard 1702 in a user interface of a measure factory for measures based on recent time periods, a current period is presented in bar graph form. The exemplary dashboard of FIG. 17 shows nine measures for a single day time period (yesterday) 1704.

Figure 18:
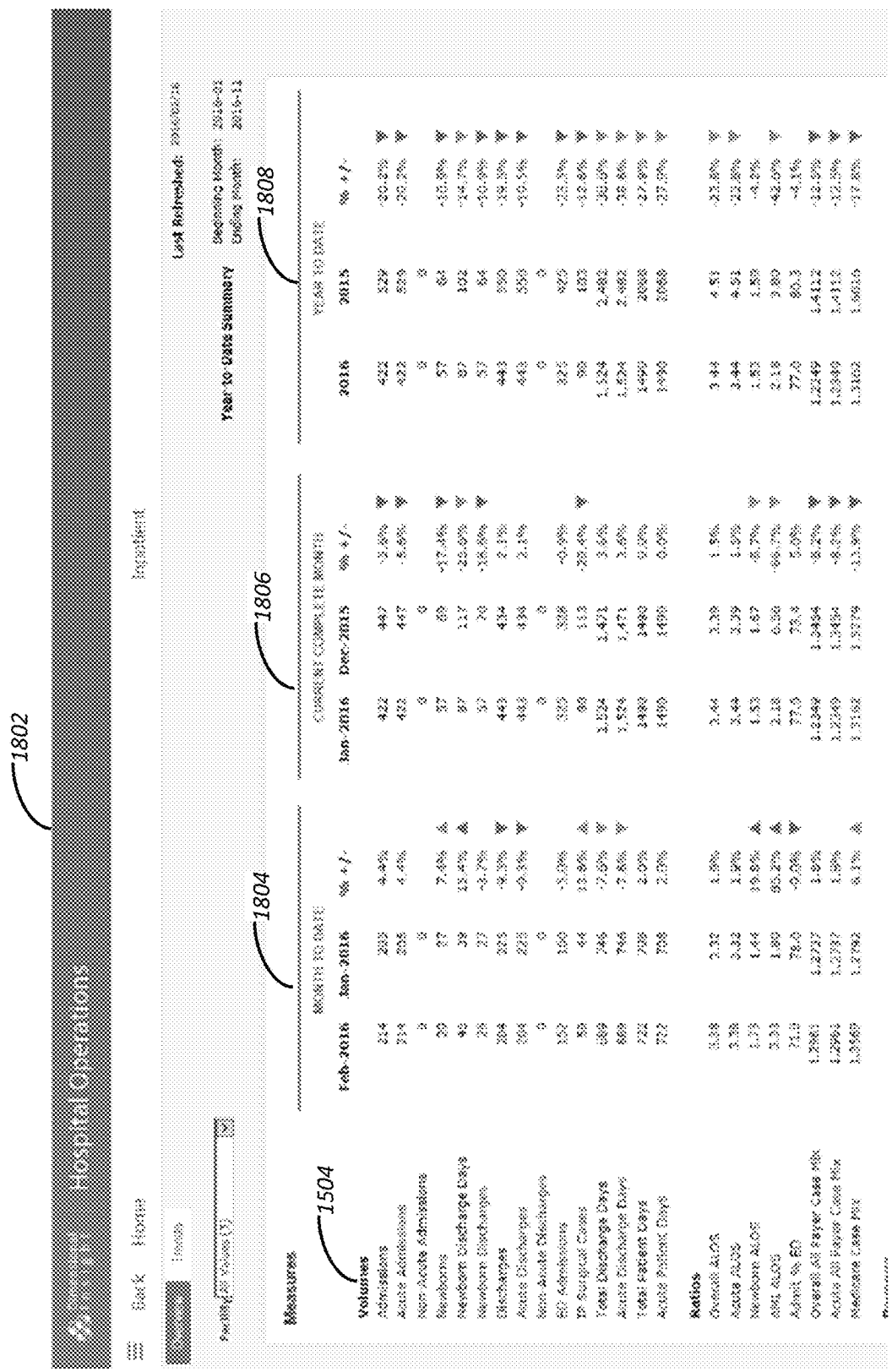
FIG. 18 depicts a table of measures in a measure factory user interface.

Referring to FIG. 18 that depicts an inpatient table 1802 of measures in a measure factory user interface, a scrollable table includes measures grouped by measure category 1504 for a range of time frames, month to date 1804, current month 1806, and year to date 1808.

Figure 19:
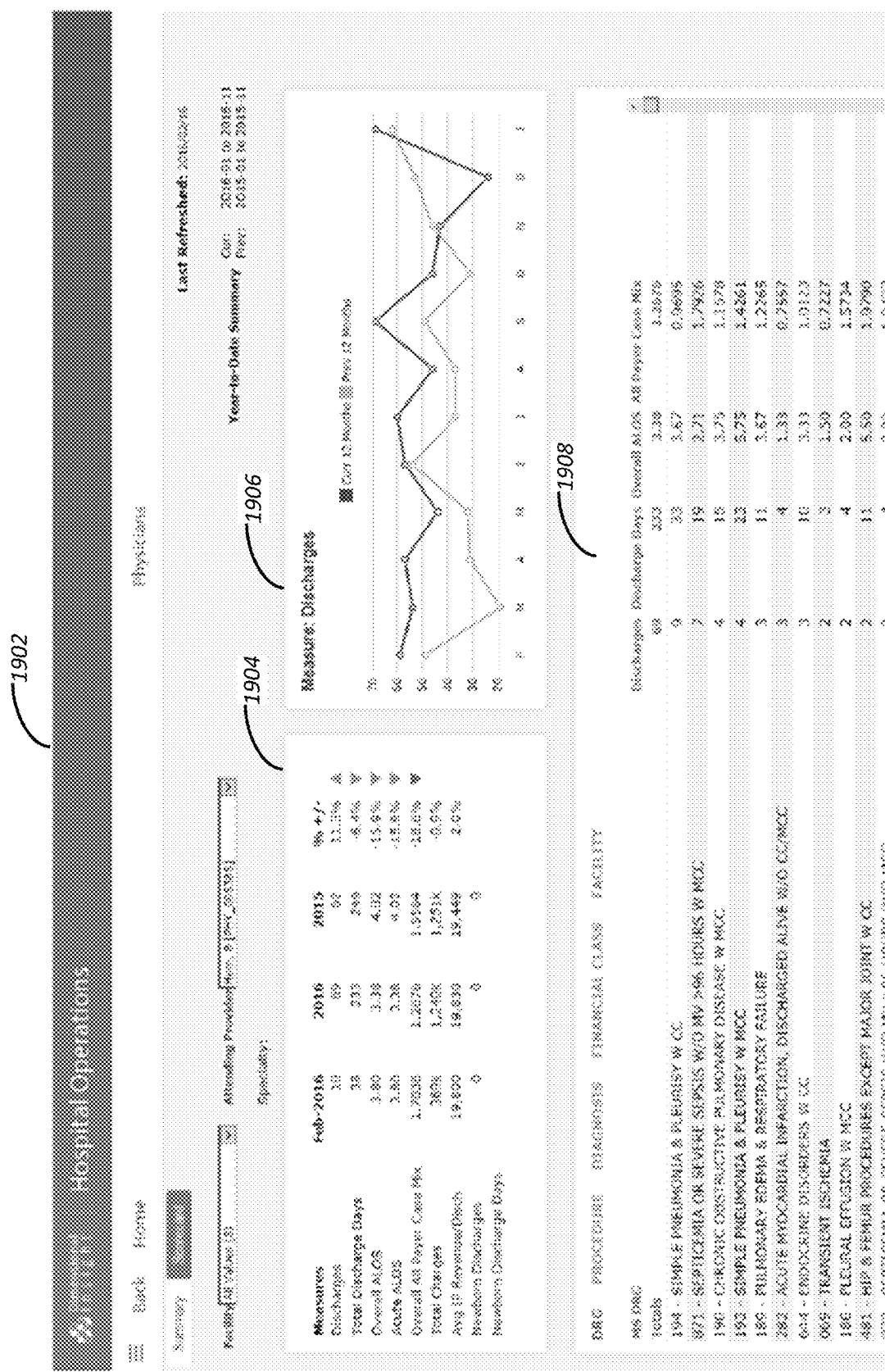
FIG. 19 depicts a multi-view dashboard in a measure factory user interface.

Referring to FIG. 19 that depicts a multi-view dashboard 1902 in a measure factory user interface, several measures for a selected physician are shown in table form 1904, line graph form 1906, and broken down by diagnosis 1908.

Methods and systems for new and novel applications of a measure factory may include automated detection of differences of business-specific performance measures via automated computation of measures by applying source rules and factory rules to business-specific data. The differences may be automatically detected by comparing measures to normalized measures of the same type to identify departures from normal. The normalized measures may be established based on historical averages. They may also be established based on past time periods.

Automated detection of differences and suggestions for sources of data that contribute to the detected differences may be accomplished through a combination of applying the source rules and factory rules as described herein to generate measures that are automatically generated from a user description of the measure, and using a data diving engine that can process the underlying definition and automated scripts that produced the measure to form a structured definition of the measure that identifies the source data, intermediately generated data, and final measures. By processing the elements that make up the measure factory, the data diving engine can pinpoint sources of measures through several iterations of computation. These sources may be original source data files, content added to the source files during measure factory execution, and the like. With this knowledge of the elements and measure factory operations that contribute to the production of measures of business performance, the data dive engine or the like can work through elements to find candidates for explaining the differences in two measures, such as a measure output for two or more time periods (e.g., current period and an earlier period).

As a data dive engine processes the actions that make up the measure of business performance it may arrange the underlying data sources so that those with a greater likelihood of contributing to the difference receive a higher rating as representing a cause of the difference. This may be done through comparing comparable source data for the two measures. As an example, if a measure of a current period is detected as substantively different from a prior period, each data value from the two time periods that contributes to the measure of the two periods may be individually compared.

Merely comparing each pair of data elements could be inefficient and may further result in many candidates. Techniques that target more likely sources of difference may be employed, such as traversing through the computations from the resulting measure backward through the computations, such as by following the script that generated the measure in reverse.

Another approach for detecting candidate sources that impact business performance as determined by comparing two measure factory measures while reducing the computing resources required for this analysis may be to compare values for these time differences while processing the values to generate the final measure. Each difference above a threshold (e.g., a percent change and the like) could be flagged or otherwise logged as a potential candidate. Likewise, as each factory rule computation is performed by the measure factory, the new rule value may be compared for a range of time periods. New rule values that exceed a threshold can likewise be flagged.

Because a measure factory may produce many measures for many different time frames trending may be calculated as part of the measure factory operation. In an example, a factory rule may be configured to generate a trend indicator or quantitative value in data records for later time frames based on data or similar indicators in data records for an earlier time frame. Another way to optimize analysis may be to compare typical time frames, such as month over month, current month to the same month in the prior year, year to date versus same period prior year, and the like.

When a difference between data used to calculate measures is deemed to be likely to be a significant contributor to the end measure differences, it may be captured or marked for further processing. As an example, a loop-type measure factory rule may be used to produce an extended description or other relevant details about the contributing elements. This information may be made available to a dashboard or other output data structure to be presented in an electronic user interface that may facilitate human analysis of the differences.

While a data analysis circuit, such as an assisted analytics circuit for automating detection of differences in measures of business performance may rely on measure factory technology, such as measures that are defined in a measure factory so that relationships among the measures (e.g., sums, ratios, and the like) may be fully defined, an assisted analytics circuit may perform detection of differences independent of how the underlying data is processed. A measure factory, such as the one described herein may provide certain definitions of relationships among the measures so that all data sources and outputs may be setup to allow automated calculation of any measure. By automating a data analysis process such as for producing assisted analytics, it may be possible to access for analysis and/or presenting in a user interface any underlying detail. The assisted analysis may be characterized by techniques that identify things of interest, such as by detecting large changes period-to-period or departures from detectable patterns and the like. The assisted analysis methods may further automatically identify contributors to the things of interest and present them with relevant context, such as "This is the highest contributor, with a confidence factor of "x". This is the next highest contributor, with a confidence factory of "y".". The result could be presented in an executive dashboard that is configurable based on measures and other information in a source of data and detected differences so that the candidate sources with greatest impact may be made most visible to the user. Alternatively, the executive dashboard could be configured so that information presented could be based on the user's role (e.g., a financial person looking at the sources of differences versus a line manager looking at the sources of the differences).

Figure 20:
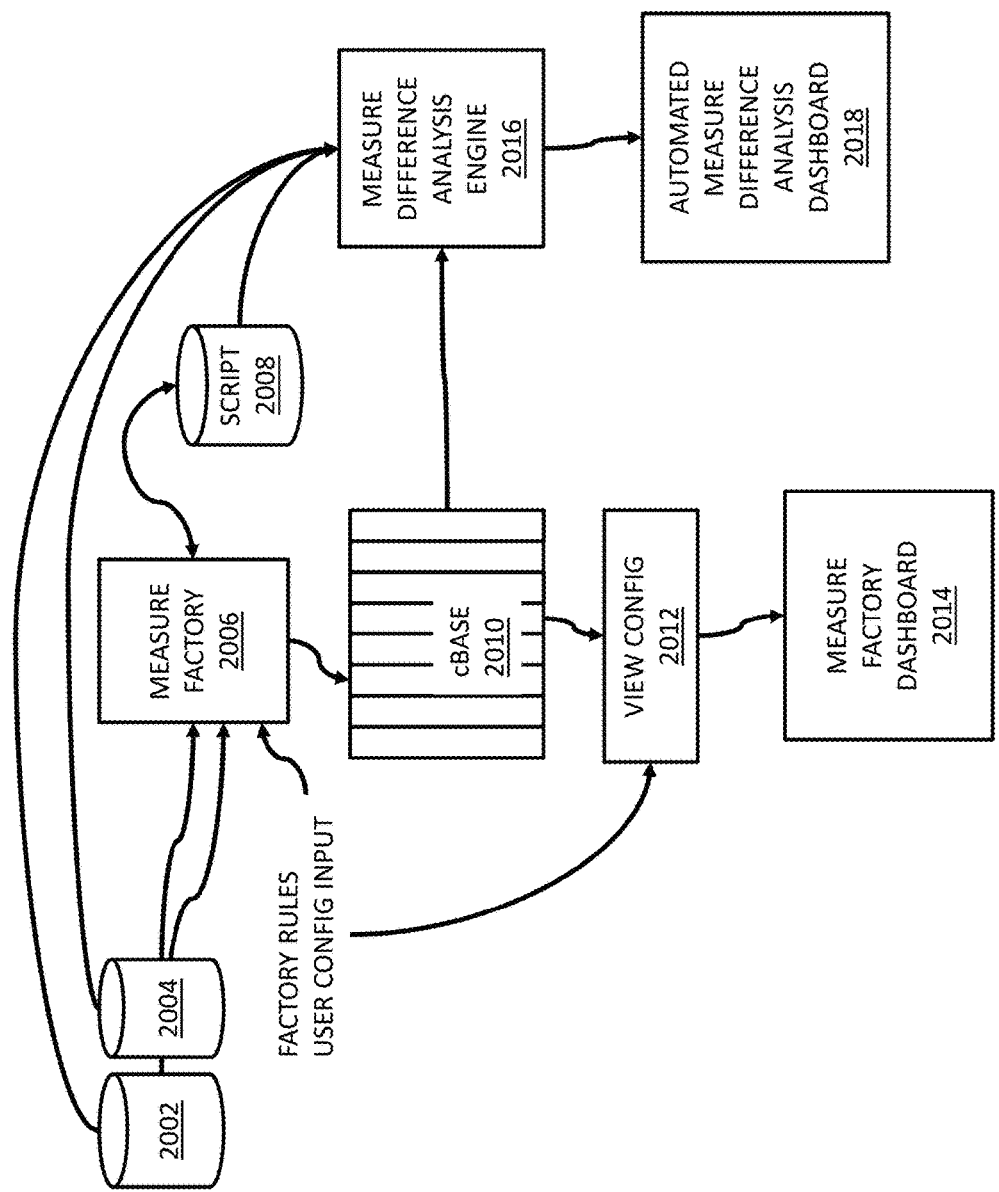
FIG. 20 depicts an application of a measure factory for automated analysis.

Referring now to FIG. 20 that depicts a diagram of system elements for measure difference automated analysis, also referred herein to as assisted analysis or assisted analytics. Data sources 2002 and 2004 may be processed to generate select KPI measures, such as by without limitation being input to a measure factory 2006 and being processed according to factory rules and user configuration input that have been transformed by the methods and systems described herein to a measure factory script 2008. In embodiments, a measure/KPI generating facility, such as a measure factory 2006 and the like produces a columnar database cBASE 2010 that may include one or more rules (e.g., columns) that contain difference impact indicators for rows of data. As described herein, these indicators may be generated by the measure factory while processing the source data to produce measures. The user configuration information may be used to produce a view 2012 of the cBASE 2010 that results in a measure factory dashboard 2014. A measure difference automated analysis engine 2016 may process the cBASE 2010 along with the script 2008 and source data 2002 and/or 2004 as described herein to produce an automated measure difference analysis dashboard 2018 as described herein. In embodiments, the measure difference automated analysis engine 2016 or assisted analysis engine 2016 may alternatively process a set of measures/KPIs for source data with difference detection procedures that may facilitate a differences dashboard 2018, which may present information useful in identifying outliers among the measures/KPIs.

Embodiments of the present disclosure may include computer-automated discovery of at least one variance-impacting dimension among a plurality of dimensions of data that contribute to a measure of business performance of business activities that are represented at least in part by the data. As the relevant dimensions of data relevant to a business increase, the potential measures (representing combinations of multiple measures) increase exponentially. Accordingly, no human can possibly evaluate all of the measures that are potentially relevant to a business. As a result of the impossibility of calculating or reviewing even a small fraction of the possible measures, businesses typically define a relatively small subset of common measures, which may or may not reflect important events or trends that are relevant to the business. However, potentially relevant measures can be identified by a computer-automated process that is based on calculated statistics with respect to individual dimensions or facts that are used to generate measures/KPIs and/or the measures that are created by performing calculations on such measures. Such variances may include variances between defined time periods, variances that are based on some normalization of a measure (such as based on historical calculations of that measure), or the like. In embodiments, detection of a variance may comprise determining data that contributes to the measure of business activity; comparing differences between at least one of calculations on the determined data, summaries of the determined data and elements of the determined data for a plurality of varying (e.g., time-period-specific) measures; ranking at least a plurality of the differences (e.g., from largest to smallest of the plurality of the differences); and presenting at least one of descriptive data for a selected top number of ranked differences and a selected top number of measures with respect to which differences were largest to a user in an electronic user interface of a computer. In embodiments, the user interface may facilitate selecting one more of the plurality of varying (e.g., time-period-specific) measures, such as to obtain further information about the data and/or dimensions that relate to the measure, including without limitation outliers and/or differences in the data. For example, a business, such as a health care facility, may track many types of information, such as admissions, re-admissions, beds occupied, diagnoses, insurance information, and the like. A measure/KPI, such as occupancy might be reviewed and compared to occupancy for prior time periods, such as the prior week, the same week the preceding year, and the like, and trends might be observed by a human user. However, occupancy of a health care facility may result from a vast array of underlying factors, such as admissions, discharges, diagnoses, births, deaths, and the like, each of which may have a large number of causal factors, such as diseases conditions, economic conditions, environmental conditions, seasonal conditions, and the like. A given level of occupancy may also result in a wide range of financial outcomes for a hospital, as the extent of insurance coverage, the nature of the conditions treated, and other factors can be important. The financial outcomes are similarly multi-dimensional. As a result, looking at a simple measure such as occupancy may provide very little insight into the real business of the operation of a hospital. High occupancy may result in outstanding financial gains, or catastrophic losses, depending on the patient mix. Stable occupancy may indicate a stable environment, or it may be a coincidental result of two opposing trends, such that a change in one of the trends might radically shift the business in a future time period. While a human user cannot possibly evaluate all of the possible causes and effects due at least in part to data in the data set being dynamically updated on an ongoing basis as part of data capture during workflow activities, an automated data analysis engine may, using computer automation, calculate values for a wide range of potential measures, such as measures involving contributing data elements that result in, for example a measure occupancy at a higher level of abstraction than the individual contributing data elements. Once those measures are calculated, variances (such as over time), of measures can be used to surface ones that appear unusual, e.g., outliers and the like such as possibly reflecting events that bear further analysis. For example, a large increase in the number of patients diagnosed with a serious infectious disease between time periods (e.g., compared week-to-week or for the same week a year before), such as drug-resistant staph infection, would be automatically detected by an automated measure factory generation and variance calculation engine and surfaced to an analyst, even if other measures, such as occupancy rates, remain stable, such as because of favorable trends in other, less threatening diseases. In the absence of harnessing the power of one or more processors and peripheral technologies (e.g. display, storage devices, and the like), such identified measures brought to the attention of staff by the automated computing devices would likely be overlooked by a human analyst, or even teams of human analysts.

In embodiments, such methods and systems for automation of assisted analytics may include an assisted analysis circuit that automatically ranks by degree of impact, business-relevant data dimensions and measures that contribute to business measures (and thus may impact a change in business performance), including detecting such dimensions and measures by automated comparison of a plurality of distinct time period-specific measures or dimensions of business performance. Such a process may be applied to the measures generated by processing (such as for a measure factory as disclosed herein, and other business intelligence processing procedures and the like) many-dimensional data representing potentially causal factors relating to the activities of a business or other enterprise and/or representing outcomes of such causal factors. In embodiments, processing with a measure factory may further include applying data processing scripts to data representing dimensions relating to business activities or measures, the scripts automatically generated from a plurality of factory rules described as relationships of source rules and relationships of other factory rules; a plurality of data sets comprised of data representing the business activities arranged as a columnar array wherein each column is associated with a distinct source rule; and a factory rule execution hierarchy that executes ready factory rules without dependency on other factory rules before executing ready factory rules with dependency on other factory rules. In embodiments, a "ready calc" factory rule is applied before other factory rules, so that measures that are ready for calculation can proceed, and a ready flag rule is applied after all ready calc rules have been applied to a given data set. Calculation of all ready-for-calculation measures can proceed until all possible calculations are performed. Thus, measures may be serially generated based on readiness for calculation, such that they may be dynamically presented for analysis based on which ones, at a given time, appear to constitute measures of interest, such as based on the variances (e.g., period-over-period) noted above. In embodiments, a hierarchy of factory rule execution indicates an order of factory rule execution. In embodiments, the hierarchy may be based in part on the nature of the measures calculated, such as commencing execution on rules that involve measures that have been determined in recent time periods to include dimensions of interest (such as involving significant variances that may reflect business-relevant events). In embodiments, the order of factory rule execution may respond to a ready-for-calculation flag and may lookup such rules to execute before executing "ready link" rules, which in turn may execute before "ready plugin" rules. In embodiments, factory rules that apply only to data within a specific data set may be executed independently of factory rules that apply to data within other data sets.

In embodiments, automated identification of dimensions and measures of interest, based on performing calculations on many dimensions that potentially contribute to measures of interest, and storing and ranking measures using time-period variances or other statistics may enable various business relevant analytic activities that were not previously possible. This may include projecting a change in a business performance measure based on analysis of differences over time of contributing data elements that, when optionally processed through a measure factory, are used to calculate the business performance measure. For example, a second business measure that appears stable may be projected to change based on discovery of an outlier in a first measure that contributes data values for calculating the second measure because the first measure is likely to have an influence on the calculation of the second measure. For example, if a hospital has had stable occupancy, but a measure of the diagnoses (disease conditions) of current patients indicates a high increase in the fraction of easily treatable conditions (when divided by all conditions), then an analyst may project a decrease in occupancy that would not have been found without the computer-automated calculation of many such measures. Such projections may also be performed automatically with the methods and systems of assisted analysis described herein, such as using change in underlying measures to identify measures for which projections should be performed, automatically performing the projections, and automatically ranking, presenting, or highlighting projections that vary significantly from normal patterns for the applicable business measures.

Other uses of the assisted analytic system may include suggesting a dimension, a measure, and/or a business-relevant event or activity as a source of a variance between two business-centric performance measures of a business, where the measures that suggest the variance are automatically generated by processing (such as optionally with a measure factory, such as using automated processing rules noted herein, and the like) multi-dimensional data representing and captured contemporaneously with performing activities of the business. Similarly, the methods and systems disclosed herein may enable suggesting an event that is characterized by data within a data set as a source of a variance between two business-centric performance measures of a business, where the measures are automatically generated by processing (such as optionally with an automated measure factory according to the various embodiments disclosed herein) data representing activities of the business.

Measures of interest, projections, events, dimensions, facts, summaries and the like that are identified by automated analysis (such as time-variance analysis) of automatically generated and calculated measures (such as optionally in a measure factory approach described throughout this disclosure), may be displayed in a dashboard, such as an operational dashboard for a business or other enterprise that automatically presents one or more such results. This may include, for example, contributors to notable variances of a measure of business performance (such as over time). Where the contributors may be determined from sources of measures (e.g., as defined by a set of factory rules of a measure factory and the like), the contributors may be tagged with a variance-impact confidence factor, and the dashboard may be automatically configured based on a determined role of a user of the dashboard. The operational dashboard may automatically re-configure to show the most relevant measure of interest, not only based on the role of the user, but based on variances described above, such as in the underlying data that is used to calculate one or more measures. In embodiments, contributors to measures may be further automatically filtered based on the determined role of the user, so that sources of data for contributors associated with the determined role of the user are represented in the dashboard (such as by descriptive information about role-specific business activities) that correspond to the sources of data for the filtered contributors. For example, a doctor may be presented with measures, projections, or the like where contributing data indicates high variances in data about disease conditions, diagnoses, patient outcomes, and the like, while a financial operator may be presented with information about measures, projections, events, or the like that involve time-variances in contributing data about occupancy rates, insurance, re-admissions, and the like.

An example scenario for deployment of the methods and systems relating to automated root cause and source detection and analysis for variance and behavior of business operation measures, referred to herein also as assisted analysis, as described in various embodiments disclosed herein, comprises a range of interfaces, each of which may represent, enable, or assist with business operations. A business may typically be configured in some sort of organizational structure, such as a reporting or functional hierarchy that can facilitate communication and operation among employees and other resources on specific business activities or workflows, consisting of tasks that are assigned to or undertaken by employees, managers, contractors, agents, representatives, or the like of the business.

Details of such an organizational structure may include the operations, goals, metrics, data sources and the like associated with portions of the organization. In this way, a link may be established between certain business operations and data used by and/or produced in association with such business operations. This link between an operation and its relevant data may be codified into various datasets. Additionally, information about connections between one business operation and another may also be understood and/or codified so that interdependencies can be readily followed. Such interdependencies may be represented in data that characterizes each business operation. A data dimension may represent such an interdependency. As one illustrative example, in a hospital setting, "patient classification" may be a data dimension. An instance of such a dimension might include "new born". Measures of business operations for the hospital, such as measures relating to admissions and neo-natal care operations, would be impacted by patient classification; therefore, these two measures of operations would have the patient classification dimension in common. Therefore, it may be logical to conclude that if data from the dimension "patient classification" caused a variation in a measure of admissions, it may also cause a variation in a measure of neo natal care, such as number of patient-bed-hours and the like. A change in "new born" patient classification data would impact measures that represent admissions as well as measures that represent neo-natal care operations. In contrast, a change in "elderly" patient classification data would impact admissions but not likely impact neo-natal care measures.

Discovery of information that signifies a potential relationship between business operational groups, organization groups, or even individuals (e.g., in distinct operational groups) may be useful in an environment where automated analysis of variations in measures, such as by an assisted analytics circuit detecting changes over time, strives to seek at least the root source of data (or changes therein) that is likely to be a primary cause for the variances. In the example above, a reduction in a measure of admissions may be found to be due in large part to a reduction in the number of "new born" admissions appearing in the data that is processed (e.g., by the measure factory or the like) to produce an admissions measure or metric. Once this first level of root cause analysis is substantially complete, taking into account the knowledge that "new born" patient classification is an instance of the patient classification dimension, other measures that rely on patient classification can be evaluated for potential variances. Likewise, measures produced for other operations that use data from the common dimension of patient classification can be evaluated for corresponding variances and for additional variances. This example can be generally applied when automatically analyzing variances in one or more measures to determine one or more sources of relevant information (data), or changes therein, that are impacting the measure. Other potential impacts can be determined through a process of automatically traversing explicit or procedural connections with the source of the data, such as when the data represents a dimension or measure that is commonly used to represent other business operations. In this case, the shared dimension of patient classification facilitates connecting a variance in admissions with a potential need to adjust neo-natal staffing, rather than emergency room, geriatric, or other specializations.

Another option for determining if a source of data that is found to impact a particular measure (e.g., admissions) also may impact other measures involves identifying other uses of the data from that source. This can be done through analysis of the formulas and procedures used to produce measures. For embodiments that rely upon a measure factor, factory rules, for example, may identify a particular type of data (e.g., patient classification) as being needed when the measure factory executes the factory rule. By identifying procedures that rely on a common data source, such as, in this example, patient classification data, it may be possible to determine what other procedures also rely on the common data source. Measures that rely on factory rules that process patient classification data may be checked for variance.

More specifically, however, a factory rule may compare the patient classification entry for each record processed to the value "new born". Measures that are dependent on a patient classification of "new born" may be impacted similarly to an admissions measure. Therefore analysis of these measures may be prioritized over other measures, such as those that are dependent on other patient classification values. Because all the data, data types like dimensions, source and factory rules, and processing procedures associated with an instance of a measure factory are accessible and understandable, automated detection of variances, their root causes, and potential impacts on other related measures is enabled.

The methods and systems of automated identification of root causes of variances in measures of business processes can eliminate much manual guess work while reducing the amount of time required to determine with a reasonable degree of confidence which business process to target for remedial action, further analysis and the like. While this benefit of these methods and systems is substantial, this is not the only benefit, nor are these methods and systems limited to determining root cause of problems that may be detectable by comparing measures to other measures and the like. As noted above, the techniques that can facilitate determining a source for data that likely has the greatest impact on a measure that has an abnormal variance can be applied to all measures, independent of their degree of variance. By determining, for each individual measure, the output data sources that are most likely to make the greatest impact on the measure, one can better understand, for example, where resources could best be placed or reallocated. Simply put, business operations that have the greatest impact on a measure that is used to manage the business may be prioritized for ongoing improvement over other operations that have far less impact. This degree of insight gained from applying the techniques for deriving a root cause for an abnormal variance to measures that do not currently present abnormal variance may help avoid the occurrence of abnormal variances.

A portion of the methods and systems described herein that facilitate this across-the-board root cause analysis are partially enabled through the use of data storage and access techniques that make the data efficiently accessible. Techniques include, without limitation, storing intermediate factory rule processing results, application of columnar data structures, optimizing queries and the like required for processing source rules and factory rules and the like.

Through a set of procedures that attempt to determine ways in which a first measure compares to other measures or data derived from other measures (e.g., an average, standard deviation, p-value, trend and the like) being executing on one or more processors, an assisted analytics circuit can facilitate determining what business operations areas are significant to look at further, and to potentially act on. As noted elsewhere herein, such determining and root-cause processing can be done globally, across all data sources, factory rules, and output measures.

The multi-dimension data sets that include data across a large number of data domains when processed for determining KPIs, measures and the like, such as through a measures engine that is exemplarily described herein generates millions of possible combinations of data elements; far too may combinations for human analysis.

In embodiments, the business operations that generate source data that is determined to be the dominant source of impact on a measure can be determined using the assisted analysis and/or assisted analytics techniques described herein. Therefore, automated generation of a view/dashboard that is specifically for the individual or team responsible for the determined source of an outlier measure, such as a business operation can include specific aspects of the business operation to target for action. Such an analysis dashboard can be presented with focus on what the individual or team has control over or at least what they are expected to control. Because the data for each measure can be annotated and/or its source can be tied to a business/organizational structure, individuals identified as being responsible for the portion of the business that sources the dominant data in the measure can directly be targeted with actionable measures as well. When this information is combined with information about an individual's role (supervisor vs executive vs line worker, and the like) the same root cause data domain/dimension/element would generate different views/dashboards based on the target user of the dashboard.

An assisted analytics technique for determining which source of measure data is likely to be a dominant contributor to a detected measure variance involves comparing the source data that contributed to the measure that is detected as having a variance and the source data that contributed to the measure from which the variance is detected. In an example, if a measure for time frame X+n is detected to have a substantive variance from the same measure for time frame X, source data for the measure for each time frame X and X+n can also be compared. A difference in the source data may indicate that this particular source of data could be the dominant factor in the measure variance. When these assisted analytics techniques are applied to data processed through a measure factor, the source data to be evaluated may be determined by merely looking at the source and factory rules (e.g., measure factory procedures) that contribute to the measure. In embodiments, context of the source data, such as how it is organized, metadata and the like for data tables, columns, and the like may be other source of outlier root cause determination. In an example, a data table that represents hospital admissions may contain information regarding the admissions department, finance, insurance processing, and other hospital departments. Based on the outlier that is detected, a source of data for the outlier could be found through examination of this organizing information. Comparing data from a single source (e.g., a particular business operation or organizational group) for the two time periods (X and X+n) can provide an indication of the relative difference in this source data for the two time periods. If the difference is consistent with the measure variance, such as would be the case if the measure variance was a negative number and the differences between the source data for the two time periods was also negative, then the source data could be tagged as a possible candidate for the measure variance. However other factors, such as weighting or importance of the source data when computing the measure, and the like could be factored into a determination of the likelihood of a particular source of data being dominant.

In embodiments, a measure factory may be adapted, or processing of factory rules may be adapted, so that source data comparison can be performed automatically while a new instance of a measure is being produced. Variance time periods can be identified so that, for example, the measure factory rules can be applied concurrently to the source data for both time periods. As the factory rules are applied, intermediate results of processing the source data can be compared for the two time periods. A significant variance in the intermediate results can automatically flag the source data as a candidate for dominance in a variance in the resulting measure. Similarly, intermediate results can be stored as a measure for each time period is produced. This stored intermediate results for different time periods can be compared with results for a new time period that is being processed by the measure factory.

Determining what source data to evaluate can also be learned through automated techniques such as machine learning and the like. In this way, sources of data that have been learned to contribute dominantly to a measure result can be prioritized for evaluation over other source data contributors to a measure. Such learning can be performed through various approaches including feedback by humans, training models, and the like. In embodiments in which these assisted analytics techniques are combined with machine learning for use with a measure factory, the feedback may be derived from source rule analysis, factory rule analysis, intermediate data comparison analysis, manually directed learning, and the like.

The methods and systems of automated, data-based root cause analysis can be facilitated during the measure factory configuration process. Source rules, factory rules, and the like can be annotated, such as in a cross reference table that relates the rule to the measure in a way that facilitates more efficient root cause analysis. Information about the importance (e.g., weighting and the like) of sources of data for a measure output could be associated with intermediate results, for example.

An example of how automated, data-based root cause analysis using measure factory processing techniques may involve a hospital system seeing decreasing admissions follows. A source of admissions measure data is each person's nationality. Through the assisted analytics root cause computing techniques described herein, it can be determined that foreign nationality admissions are significantly reduced. When this aspect of patient information is detected, corresponding uses of patient information, particularly nationality, for producing measures can be evaluated. Diagnoses that appear to be well correlated to a person's nationality may see a similar reduction.

In this example, rather than starting with hospital admissions showing a substantive difference and using that information to track down other measures that may be impacted by a reduction in certain nationalities, measures for diagnosis can appear as initial indicators of a potential problem. Diagnosis of bronchitis may be significantly down. Through machine learning or other training techniques, a strong correlation between bronchitis diagnosis and patient nationalities can be determined. This information may be used to direct root cause analysis of other measures that rely on patient nationality, such as admissions. Alternatively, a reduction in bronchitis diagnosis may be traced back to a doctor who specializes in respiratory ailments being on vacation and therefore patients looking for such a specialist may turn elsewhere.

An exemplary description of these methods and systems follows. Performance and related data is collected from certain business operations. Those business operations are identified so that when data from the business operation is determined to be a candidate source of a measure variance, information about the business operations to which the performance data pertains can be accessed and used in a report about the variance. The more detailed the information, the more directed the report can be. Measures of business operations are produced (e.g., based on source and factory rules of a measure factory and the like) for the business for a plurality of time periods. The measures for different time periods are compared and variances are noted. Significant variances become candidates for root cause data analysis. Data that is used to generate the candidate measure may be compared between the different time periods. When a substantive difference is detected at the source data level, information about the source stored when the data analysis system (e.g., a measure factory and the like) was configured may be accessed and a dashboard that targets the business operation or structural group that is responsible for (e.g., that produces) the performance data that is determined to be a likely dominant factor in the measure variance is automatically produced and pushed out to the individuals of the group and/or others such as executives and the like.

In embodiments, business performance metrics, or measures, such as key performance indicators (KPIs), cost metrics, workflow metrics, revenue metrics, profitability metrics, reimbursement metrics, output metrics, safety metrics, and many others (collectively referred to herein as KPIs, measures or metrics, except where context indicates otherwise) may be useful in determining aspects of a business, such as a business flow and the like that may benefit from optimization, improvement, maintenance, or management. Determining which aspects may need improvement and which measures may indicate an aspect for improvement is not always apparent to business participants, such as workers, managers and the like. This is particularly true in complex environments that involve many workers who undertake widely varied tasks that interact with each other, such as in hospital environments, manufacturing environments, retailing environments, distribution environments, and the like. Employing subject matter experts to survey measures may not only be costly, but it may require retaining a person with a high degree of expertise, such as in using complex statistical software programs, analytics programs, business intelligence programs, or the like, over long periods of time. However, statistical analysis of measures may itself facilitate a start at determining where attention should be placed within an enterprise, such as by surfacing indicators of where variations are occurring in a business from historical measures, such as through detection of measures that fall outside a standard deviation range for given measure. While useful, merely using basic standard deviation information can lead to undue attention on low-value indicators, since some processes may not be well enough characterized to exhibit reliable conformance to a single standard deviation. Such a result may generate a false positive, that is, detection of a problem where none exists.

Using a statistical approach that is formed around key dimensions of data from which measures are derived can lead to greater confidence in determining actionable outlier anomalies among measures. However, with potentially large quantities of data to generate measures and a resulting large number of measures, analysis using conventional software programs, such as ones that allow one-by-one analysis of standard measures, falls short. A need exists for an improved software platform as described herein that facilitates automation of discovery of relevant measures, including automated analysis of measures and their time-based or instance-specific variances, which may further reduce detection of false positives and lead to faster problem detection. To prepare for improved automation of such analysis, the platform described herein may first define anomalies for various dimensions of data, such as anomalies in measures for different periods of time that may occur when comparing comparable time periods of collection, such as current month to prior month and the like. In embodiments, methods and systems for discovering and defining an anomaly may take into consideration a range of data-driven factors, such as a count of dimensions of the data used to calculate a measure, a count of instances of contributors to the dimensions of the data (e.g., doctors may be a dimension and a number of doctors in a hospital system may be a count of contributors and the like), frequency of change of data, a number of measures for each dimension, a number of processing steps or an amount of computing resource required to calculate a measure (based on dimensions involved and other factors) and the like. Anomaly definition may therefore be impacted by variability in the data, and the like. Therefore, in embodiments, an anomaly specification may be different for each measure (such as based on involved dimensions), and the like. Assisted analytics may facilitate determining for a given anomaly which measures to evaluate, which time windows to consider, which dimensions to include in KPI measures, and the like. As described below, assisted analytics may be used in an iterative process to characterize measures for anomaly definition and detection. The complexities of the specifications for measures, variability, anomalies, time windows, and other data analysis is beyond the scope of human analysis or teams of humans, and may be processed in real-time using one or more processors and modern computing resources.

Anomalies within a given dimension of source data may also occur for different measures within the dimension. When anomalies detected in measures share a dimension (e.g., doctors in a hospital system or sales managers in a retailing business), or perhaps a contributor to the dimension (e.g., a specific doctor or manager), even when measuring different aspects of the dimension or contributor (e.g., admission days and diagnosis codes involving a doctor, or regional sales and profitability involving a manager, and the like), confidence of the source of the anomalies may be increased. Likewise, when multiple calculations using somewhat different data elements produce the same anomaly, the likelihood that the anomaly is actionable is increased. Therefore, considering multiple types of measures involving calculations within and across dimensions may contribute to anomaly discovery and definition. However, determining that there is a common dimension or the like across anomalies may also be an outcome of analysis of the measures rather than as an incoming assumption that must be applied to the assisted analytics process. In embodiments, because all information that contributes to a measure, including the dimensions, sources of data, intermediate computations, and the like may be available and tracked in a way that facilitates visibility to the same, concurrence of contributors and the like may automatically be detected for candidate anomalies. Automated analysis of the information that contributes to measures, particularly to candidate anomalies, can be performed to facilitate determining when a plurality of candidate anomalies, such as four or more, share a common aspect (e.g., a specific doctor, specific time interval, a specific facility, and the like). A benefit of using data-driven measures and applying methods and techniques of assisted analytics, such as those described herein, to measures is that individuals with less subject matter expertise can find and utilize actionable information. Individuals may use such assisted analytics techniques to make changes to localized business processes, such as those within a department or work group and can determine how those changes are improving the process through continued use of the assisted analytics.

In embodiments, when one or more candidate anomalies are detected, particularly those that may be strengthened through sharing of a dimension contributor, assisted analytics can be applied to historical data (e.g., by use of the assisted analytics circuits, methods, and systems described herein), such as for a set of time periods to determine if the same dimension contributor has been producing candidate anomalies over time (e.g., time invariant) or if the candidate anomalies appear to be time variant, such as occurring in only one measure period, e.g., only for a current month, but not for a prior month or the like. Time invariance of candidate anomalies indicate a greater likelihood that the anomaly is a bona-fide anomaly that may deserve attention.

In embodiments, measures for individual sites of a multi-site organization, such as a group of hospitals, may also be compared. If comparable KPIs for two sites vary, a substantive variation may suggest that one of the KPIs is indicating an anomaly. This may include comparing KPIs among many sites, with increasing confidence that a single site with a KPI that varies significantly from the average for a group constitutes a genuine anomaly that bears closer attention by an analyst or manager.

In embodiments, a method of defining a specification of an anomaly for a set of KPIs may include a plurality of passes of assisted analytics that detect potential anomalies. Each pass may adjust an anomaly threshold, so that the count of anomalies approaches an anomaly count target number (such as a reasonable number that an analyst can review during a work period, such as an hour or a day). In embodiments, when counts of anomalies start out high, the anomaly threshold would be raised so that fewer anomalies would be detected in a second pass. Such a process may include executing a first pass of an assisted analytics process that identifies KPIs that exceed a single-standard-deviation from an average KPI (referred to as single-deviation KPIs), such as those produced by a measure factory, such as business performance KPIs that fall outside of one standard deviation of the KPIs. In embodiments, an assessment of the single-deviation KPIs to further determine the specification of the anomaly may include comparing a count of the single-deviation KPIs to an anomaly detection threshold value. If the count exceeds the threshold, then a second pass may be performed. This second pass may identify only KPIs that fall outside of two standard deviations from the averages of the respective KPIs. This process of comparing a count of identified KPIs with the anomaly detection threshold value and adjusting the number of standard deviations may continue until a count of KPIs identified is below the anomaly detection threshold value. In embodiments, such a process may be automated. In embodiments, such a process may include a feedback interface that may adjust the threshold. The feedback interface may receive input from a person, such as a business analyst or subject matter expert. In embodiments, the feedback interface may receive input from a machine learning system that processes the KPIs with the result of threshold comparison. In embodiments, an anomaly detection threshold value may be adjusted based on the feedback, including based on machine learning and the like.

In embodiments, defining a specification of a dimension-specific anomaly for set of KPIs may include a first pass of an assisted analytics process that takes KPIs for the specific dimension and identifies single-deviation KPIs of the dimension, such as those produced by a measure factory, such as business performance KPIs of the dimension that fall outside of one standard deviation of the KPIs. The KPIs may include measures of business performance for different members of the dimension, such as different values, indices and the like. In embodiments, a dimension may include, for example, doctors in a hospital, and members of the dimension may be individual doctors. KPIs for a given performance may be generated for each doctor in the dimension of doctors, resulting in a set of data, specifically doctor-differentiated KPIs. In embodiments, to further determine the specification of the dimension-specific anomaly, an assessment of the single-deviation, dimension-specific KPIs may include comparing a count of the single-deviation KPIs to an anomaly detection threshold value. The anomaly detection threshold value may be dimension-specific. The threshold value may be selected from a data set of anomaly threshold values by using the dimension as an index into the data set. If the count exceeds the threshold, then a second KPI anomaly detection pass may be performed. This second pass may identify only KPIs that fall outside of two standard deviations of the KPIs for the given dimension. This process of comparing a count of identified KPIs with the anomaly detection threshold value and adjusting the number of standard deviations may continue until a count of KPIs identified is below the anomaly detection threshold value.

In embodiments, a doctor-specific dimension may include doctors from a single hospital or practice, from a plurality of hospitals, and the like. The assisted analytics methods and systems may be applied to doctor-differentiated KPIs for all doctor members in the dimension, for doctors within a given hospital or practice, for doctors that have privileges at the plurality of hospitals and the like to determine KPI outliers. In embodiments, the assisted analytics methods and systems may be applied to hospital-differentiated KPIs, such as for aggregated KPIs for all doctors that have exclusive privileges in one of the plurality of hospitals.

In embodiments, identifying candidate anomalies in a set of business performance data that may indicate a need for adjusting a business process may be performed independent of the type of business, the type of factors contributing to the business performance data, and the intended use of the candidate anomaly identifying results. In embodiments, outliers of any data set may be detected with the assisted analytics methods and systems described herein.

Determining actionable outlier anomaly thresholds may be done through varying statistics, such as by indicating a threshold as one or more standard deviations and adjusting the threshold (the number of standard deviations) until the count of anomalies fits a business criteria, such as a count of anomalies for which business resources are available. Other variations may also be applied when determining actionable anomalies, such as varying a measure used to calculate the anomalies, varying a dimension for which measures are calculated, varying time periods during which anomalies are accumulated. Examples of each such variation approach are now presented.

Candidate anomaly thresholds may be adjusted by varying which measures are processed with the assisted analytics approaches described herein. In embodiments, an anomaly threshold may be adjusted by combining measures. As an example, a measure of admission days per diagnosis for one hospital may result in assisted analytics indicating a high number or of candidate anomalies. However, when the measure is varied to include two or more hospitals, the number of anomalies may be reduced. Therefore, varying how measures are calculated, or which measures are analyzed can contribute to improving anomaly validity. Such an approach can be used in reverse to detect candidate anomalies. In an example, by varying the admission days per diagnosis measure from covering two hospitals to covering just one, a resulting number of anomalies may increase sufficiently to trigger a follow-up action.

Anomaly count thresholds that may facilitate detecting actionable anomalies may be adjusted by varying which dimensions for a business performance data set are measured or are used in calculation of measures, such as calculations involving various simple or complex mathematical operations on data for pairs of dimensions, triplets, or higher-level combinations, permutations, and the like. In embodiments, a measure of admission days per diagnosis code, when applied to a dimension of doctors may yield a high variation of the resulting measure. Whereas measuring the same aspect (e.g., admission days per diagnosis code) for a hospital dimension that is independent of which doctor authorized the admission, may result in a lower degree of variation. Because greater variation in a measure likely results in greater numbers of candidate anomalies, admission days per diagnosis code for the doctor dimension may result in a larger number of candidate anomalies than the same measure for a hospital dimension. Varying analysis by considering combinations and permutations of dimensions may help identify anomalies that are otherwise obscured. For example, if a commonly used measure (such as profits per unit) involves division of two other measures (total profits divided by total units), both of which display high negative deviations from their historical averages, use of the calculated measure might fall well within historical averages, missing the fact that both contributing measures are highly anomalous (such as where unit sales and total profits have crashed). By exploring anomalies in various combinations and permutations of dimensions, ones that are otherwise obscured by the combination can be surfaced for further analysis.

Anomaly count thresholds that may facilitate detecting actionable anomalies may also be adjusted by varying a time aspect that contributes to the anomaly calculation, such as by calculating a corresponding measure differently. In embodiments, measures may be used to determine business performance for a fixed time period, such as a day, week, month and the like. Variation over some of these periods of time may be artificially greater due to uncontrollable circumstances, such as weather events, calendar events, such as holidays and the like. Therefore, time periods that include these events may generate measures that result in many anomalies. Simply by extending the length of a time period to include more "normal" days, essentially days without such events, while variation may be higher than similar periods without these days, the overall variation may be reduced as a function of the size of the measurement period. Likewise, comparing time periods year over year may impact variation of a measure as compared to consecutive time periods. Therefore, by adjusting length of time periods and their placement, such as along a calendar may facilitate determining what threshold value to use for detecting actionable anomalies. In embodiments, the platform may allow definition of equivalent sets of time period for comparison of measures between periods, such as year-to-year comparisons of parts of a year. For example, actual calendar dates for the Thanksgiving Weekend vary each year, but that time period can be defined to facilitates automated comparison of various measures for that four-day period, rather than comparing the same four calendar dates, which are less representative of the real changes between two years, such as for retailer that depends heavily on results during that weekend each year.

In embodiments, a result of the assisted analytics methods and systems described herein may include one or more abnormal KPIs and the like. The results may be processed by a results-routing layer that facilitates delivery of results based on information descriptive of the results, such as if the results are dimension-specific and the like. For dimension-specific results, the results-routing layer may route the results to any of a plurality of results analysis facilities. The routing of the results may be based on an association between the dimension and a results analysis facility. In embodiments, results that are specific to a doctor domain may be routed to a facility that is configured to handle analysis of doctor anomalies. In embodiments, the results that are specific to a physical environment domain may be routed to a results analysis facility handling physical environment results. This results-routing layer may determine the analysis facility based on the dimension of the source data to be analyzed, and the like.

In embodiments, the results-routing layer may collect feedback from the analysis facilities, such as from users operating the analysis facilities and the like and provide it, directly or as an output of processing the feedback to a system generating the KPIs, such as a measure factory, and the like.

In embodiments, feedback regarding usability or usefulness of detected anomalies may also be gathered and used in a closed loop system that produces anomalies and learns from feedback, such as human generated, machine generated and the like.

Figure 21:
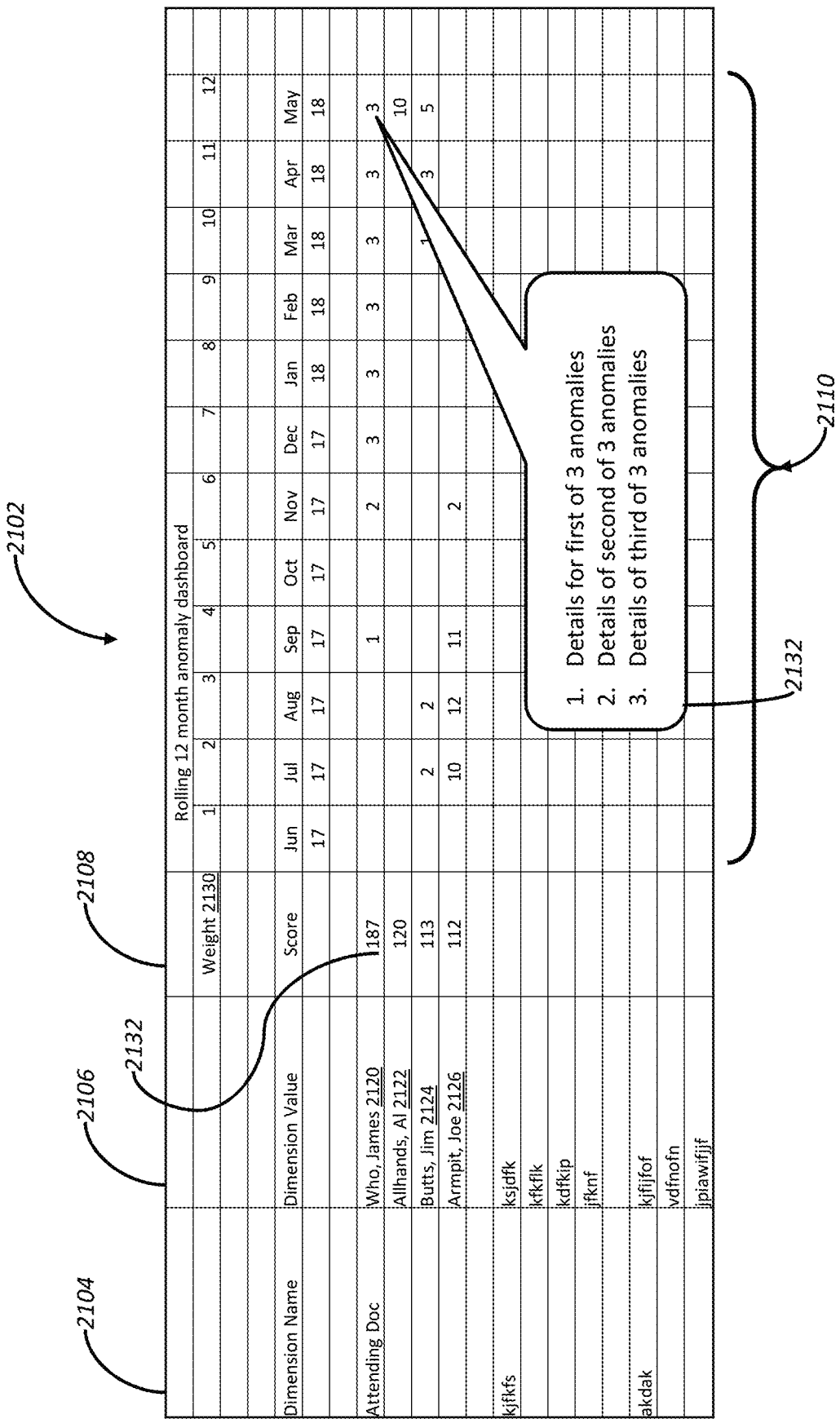
FIG. 21 depicts an assisted analytics dashboard.

In embodiments, an exemplary assisted analytics dashboard 2102 is presented in FIG. 21. The dashboard 2102 may be produced from data by analyzing business performance measures, such as KPIs and the like. An assisted analytics dashboard 2102 may present information in an interactive format that facilitates detection of potential sources of statistical anomalies, such as individuals, business processes and the like that may contribute to poor business performance, and the like. The dashboard 2102 includes several types of columns including a dimension name 2104 column, a dimension value 2106 column, a dimension value anomaly score 2108 column, and several anomaly incidence 2110 columns. In the specific example dashboard 2102, twelve anomaly incidence columns that correspond to the most recent twelve months are shown.

In embodiments, the dimension name 2104 column may facilitate distinguishing values, scores, and incidences for a plurality of different dimensions of data, such as Attending Doctor and the like. Any dimension of source data could be identified in the dimension name 2104 column. Dimensions that are described throughout this and related documents incorporated by referencing herein may provide additional examples. The dimension value 2106 column may include specific values for each named dimension, such as names of individual doctors within the Attending Doctor dimension name. The number of entries in the dimension values 2106 column for each named dimension in an assisted analytics dashboard 2102 may be limited to a subset of all possible dimension values in a variety of ways. Exemplary rules that may be applied for limiting such entries may include listing only dimension values that have a dimension value anomaly score above a threshold value, listing only dimension values that fit to a business criteria, such as doctors who practice at specific hospitals, or who have certain specializations, and the like. The ordering of the dimension value 2106 column entries may also be affected by context, such as listing the entries in anomaly score 2108 value descending order as is shown in dashboard 2102. Other ordering may include alphabetical/chronological/or other dimension value-specific aspect. Ordering may also be based on other information associated with the entries, such as a significant change in score from a prior generation of the dashboard (e.g., entries with the greatest changes in score, such as percentage change and the like).

In embodiments, the dimension value anomaly score 2108 column may be populated with anomaly scores for the listed entries in the dimension value column. Likewise, the anomaly incidence 2110 columns may be populated with anomaly incidences (e.g., counts of occurrences and the like) for each month in which at least one anomaly has been detected. Entries in the anomaly incidence score 2110 columns may be sourced from processing various analytics that are applied to business process measures, such as those produced by a measure factory as described elsewhere and herein. For a given dimension value, e.g., a specific doctor, anomalies may be calculated for a range of performance metrics; however, any given assisted analytics dashboard 2102 may be limited to a subset of such a range. In embodiments, a dashboard may be created to facilitate viewing comparison among, for example, diagnosis error rates, and the like. Alternatively, a plurality of metrics may be used for calculating anomalies, such as doctors whose patients have longer than expected hospital stays for a given diagnosis. Yet alternatively, a dashboard may be generated that shows all anomalies calculated for doctors across all sources of data.

An assisted analytics dashboard 2102 and the like may be populated with any number of incidence score 2110 columns. In the example of FIG. 21, the incidence columns represent twelve time periods, specifically the most recent twelve months. Therefore, incidence data reported in each column may be limited to incidences reported in the referenced month. In the example of FIG. 21, the incidence columns reference anomalies detected in twelve months from June 2017 to June 2018. Anomalies that occur in a given column, which matches to a specific month identified at the top of the respective column, would appear under the anomaly month along the row of the doctor to which the anomaly is attributed. Specifically, during May 2018, three anomalies that meet the anomaly determination criteria are reported for doctor Who 2120, ten anomalies for doctor Allhands 2122, and five anomalies for doctor Butts 2124; however, no anomalies are reported for doctor Armpit 2126.

Referring to FIG. 21, dimension value score 2108 may be calculated to facilitate presenting dimension values that may need attention for improving a business workflow, standards, and the like. In the example of FIG. 21, score 2108 is calculated as a weighted sum of the incidence column data for each dimension value, wherein a weight that corresponds to an incidence column weight value 2130 is multiplied by the count of incidences and summed with all other products of column weight value and incidence value. This approach provides greatest weight to the most recent months, while ensuring that anomalies detected in every month of the past 212 months are counted. Such an approach may be useful in that it facilitates flagging large recent spikes in anomalies over a series of comparable incidence counts that occurred several months ago. Specifically, in the example of dashboard 2102, doctor Allhands has a higher score than doctor Armpit even though the total number of incidences for doctor Armpit is over three times that of doctor Allhands. The incidence data for doctor Armpit may suggest that there was a high incidence of anomaly for this doctor in July-September 2017, but it may have been resolved, or at least is no longer a measurable problem, because there are no anomalies counted for this doctor in at least the past six months. An exemplary dimension value score calculation formula may be written as $$\text{SUM}(ICWn*ICVn) \text{ for } n=1 \text{ to } n=12$$

where ICW is the weight indicated at the top of each incidence column, and ICV is the incidence value for the dimension value for which a score is being calculated.

In embodiments, the incidence columns 2110 may be defined to depict time-series data, such as a set of consecutive time units, such as calendar months, weeks, days, quarters, and the like. The columns may also represent other aspects of the data or units, such as other dimensions, domains, and the like (e.g., each column may represent a different hospital in which the doctors in the dimension value 2106 column admit patients, and the like).

In embodiments, the data that populates the dashboard 2102 may be configured in one or more data sets that may facilitate linking among the values and to other data that may be stored in the data set or stored externally and linked thereto. In embodiments, the values in the incidence columns 2110 may be configured in the electronic display as active links that, when activated facilitate access to additional information relating to the value, such as identifiers of each of the incidences that are counted in the incidence value, sources of data that are used to generate the measures that are analyzed for generating this report, and the like. Information that may be less closely related to the incidence count may include, without limitation, business processes that are measured by the underlying measures of which these incidences are sourced. Such incidence column data values may facilitate access to further details about the anomalies that are represented by the incidence value. Such a link may open an additional window, such as a pop-up window or full screen window with the additional details. In embodiments, such a link may link to another assisted analytics dashboard and the like.

Referring to FIG. 21, incidence data in incidence data columns 2110 for doctor Who 2120 indicates that three (3) anomalies have been reported each month for the most recent 6 months (December 17 through May 18). In embodiments, selecting one of these entries in an electronic user interface in which this dashboard is presented may generate a pop-up window 2132 that lists the three individual anomalies and relevant contextual data. In embodiments, an anomaly incidence count detail window may also include the anomaly values, their position on a bell curve of measures from which the incidences are outliers, business workflows, and the like that are being measured to produce these anomalies, dimensions, statistics, time periods and the like associated with the anomalies, and the like.

Figure 24:
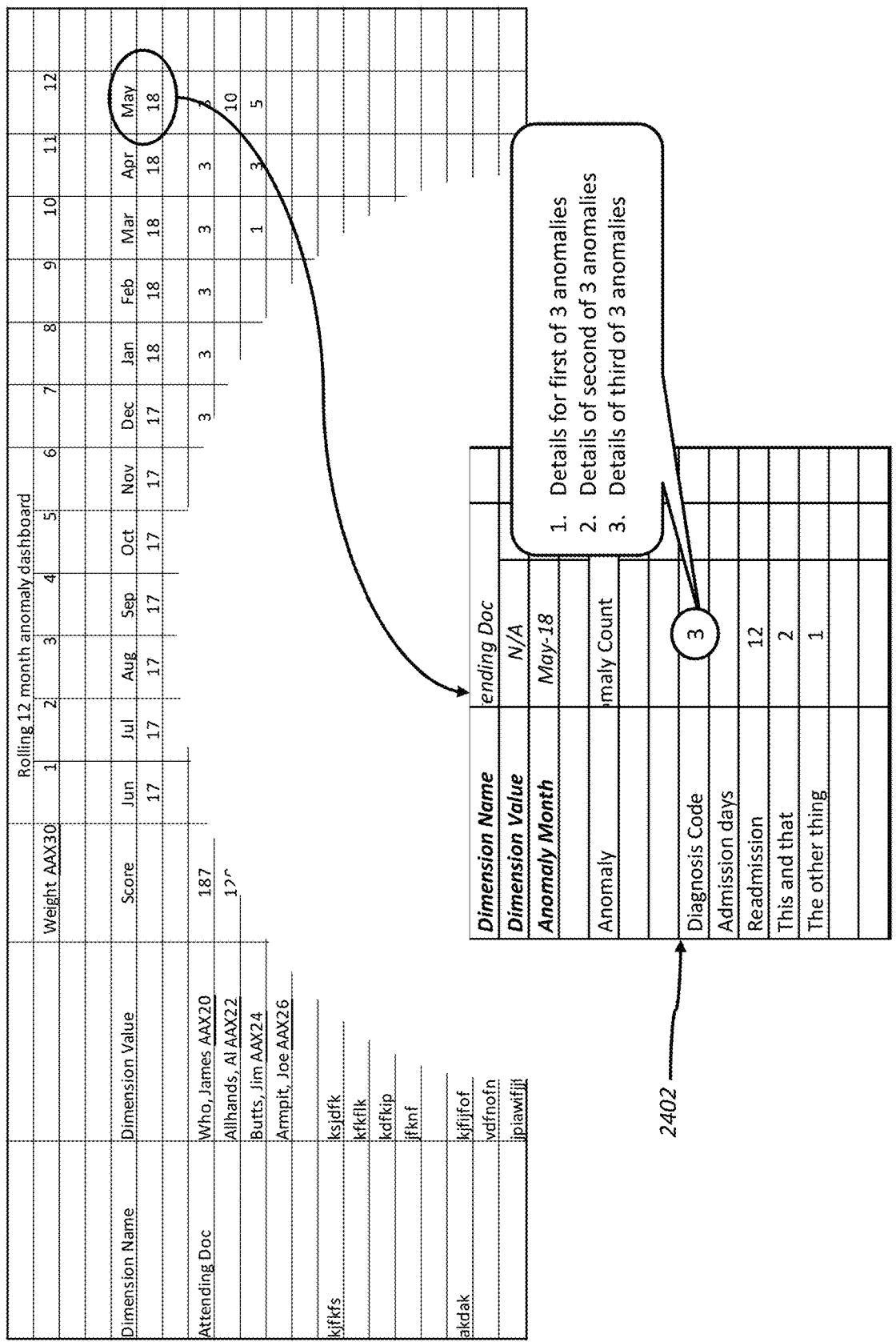
FIG. 24 depicts a third dashboard breakout of a column heading presented in the assisted analytics dashboard of FIG. 21.

In embodiments, a breakout of the anomalies for any given incidence column 2110 may be generated by selecting the column heading, such as depicted in FIG. 24 in which the column headed by "May 18" is selected. A resulting month detail dashboard 2402 may include a breakdown of the anomalies listed in the selected column. In this example, dashboard 2402 now shows counts of each of the anomalies detected, without regard to which doctor they are attributed. This may facilitate diving deeper into a root cause analysis by further enabling a user to, for example, select an entry in dashboard 2402, such as the number "3" aligned with "Diagnosis Code". Such a selection, which may include dwelling a pointer over the number "3" may generate a popup window that provide, for example, details of each of the three diagnosis code anomalies, and the like.

Figure 22:
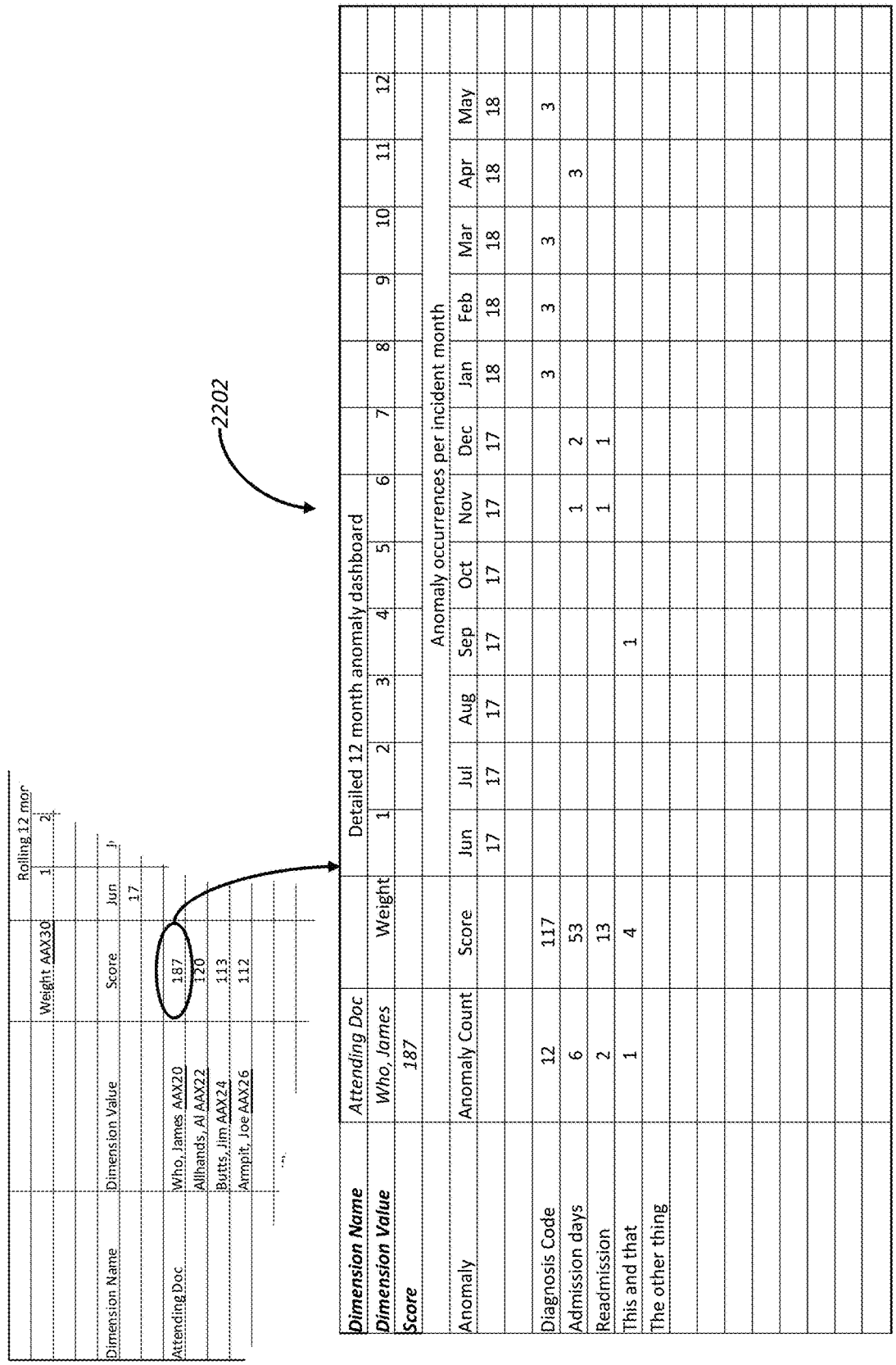
FIG. 22 depicts a second dashboard breakout of a value presented in the assisted analytics dashboard of FIG. 21.

In embodiments, active linking of content presented in a dashboard may apply to any item of visible content in the dashboard. As an example, referring to the dashboard 2102, selecting a dimension value score, such as the value "187" 2132 may facilitate linking to details about the value. In embodiments, an additional window may be presented responsive to a user selecting the value "187". Such a window may include a variation of an assisted analytics dashboard and the like. Such a dashboard 2202 is depicted in FIG. 22 and may present information useful for understanding the significance of the selected value. The dashboard of FIG. 22 may include a list of the individual anomalies, a formula used to generate the selected value, and the like. The exemplary dashboard of FIG. 22 may further present time-based information that may correlate to the incidence column data in referring dashboard 2102. This may provide the user with a visualization of the incidences, their number of occurrences and timeframes of occurrence and the like.

Figure 23:
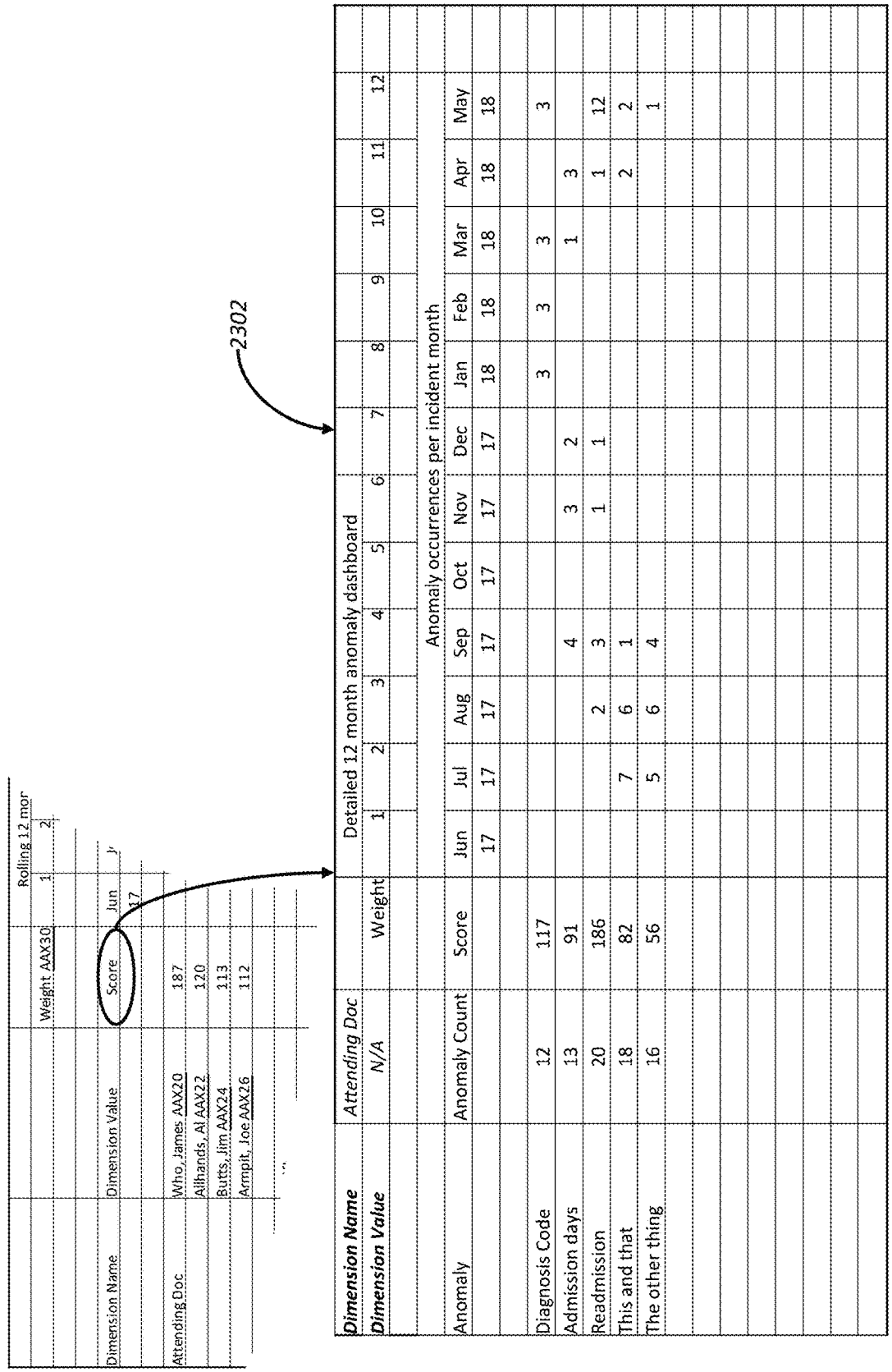
FIG. 23 depicts a second dashboard breakout of a column heading presented in the assisted analytics dashboard of FIG. 21.

In embodiments, an alternate detailed dashboard is presented in FIG. 23. This dashboard 2302 presents the list of anomalies from dashboard 2102 independent of the doctor to whom the anomaly is associated. In this way, occurrences and patterns of individual anomalies can be visualized. In FIG. 23, each of the types of anomalies that contribute to the incidence counts in dashboard 2102 are still captured; however, counts and occurrences for each of the past 212 months for each individual anomaly type anomaly is presented. Similar to the linkable content of dashboards 2202 and 2402, each of the entries in the dashboard 2302 may be configured with active links that facilitate presenting details responsively to a user selecting an entry.

In embodiments, identifying candidate anomalies in a set of data, such as business performance data and the like may help in identifying one or more opportunities for adjusting, for example a business process. Identifying candidate anomalies in such a set of data may be performed independent of the underlying source of data, the type of business, the type of factors contributing to the business performance data, and intended use of the candidate anomaly identifying results, and the like. In embodiments, financial data, such as Cost of Accounting and the like may be processed to detect outliers with the assisted analytics methods and systems described herein. While exemplary data sets are described herein as being processed by a measure factory, such as to produce PKIs as measures and the like, the methods and systems of assisted analytics herein may benefit from, but are not necessarily dependent on information produced, such as intermediate tables, calculations, tagging of data and the like of a measure factory; however, the method and systems of assisted analysis are described herein as operating independent of a measure factory or the like.

Figure 25:
FIG. 25 depicts a dashboard from which assisted analytics may be activated.

In embodiments, a dashboard of hospital operations that is independent of how the information presented in the dashboard is produced is depicted in the dashboard 2502 of FIG. 25. A source of information, such as operations 2504 from which the dashboard is produced may be configured with, such as with metadata, column definitions (e.g., for a columnar database and the like) and the like or may reveal through discovery and the like, certain measures 2506 that facilitate characterization and/or understanding of the data. Data related to any one or more of these dimension (e.g., total admissions, in-patient surgical cases, emergency department visits, and the like) may be presented in the dashboard. Here, data for a dimension total admissions 2508 is presented.

The methods of assisted analytics, such as those presented herein may facilitate interaction and understanding of underlying causes for outliers within one or more data sets, such as in this example, total admissions for hospital operations. This may be accomplished through analysis of the data that is responsive to user selections in the dashboard 2502 and results of such analysis presented in other interfaces/dashboards and the like.

Figure 26:
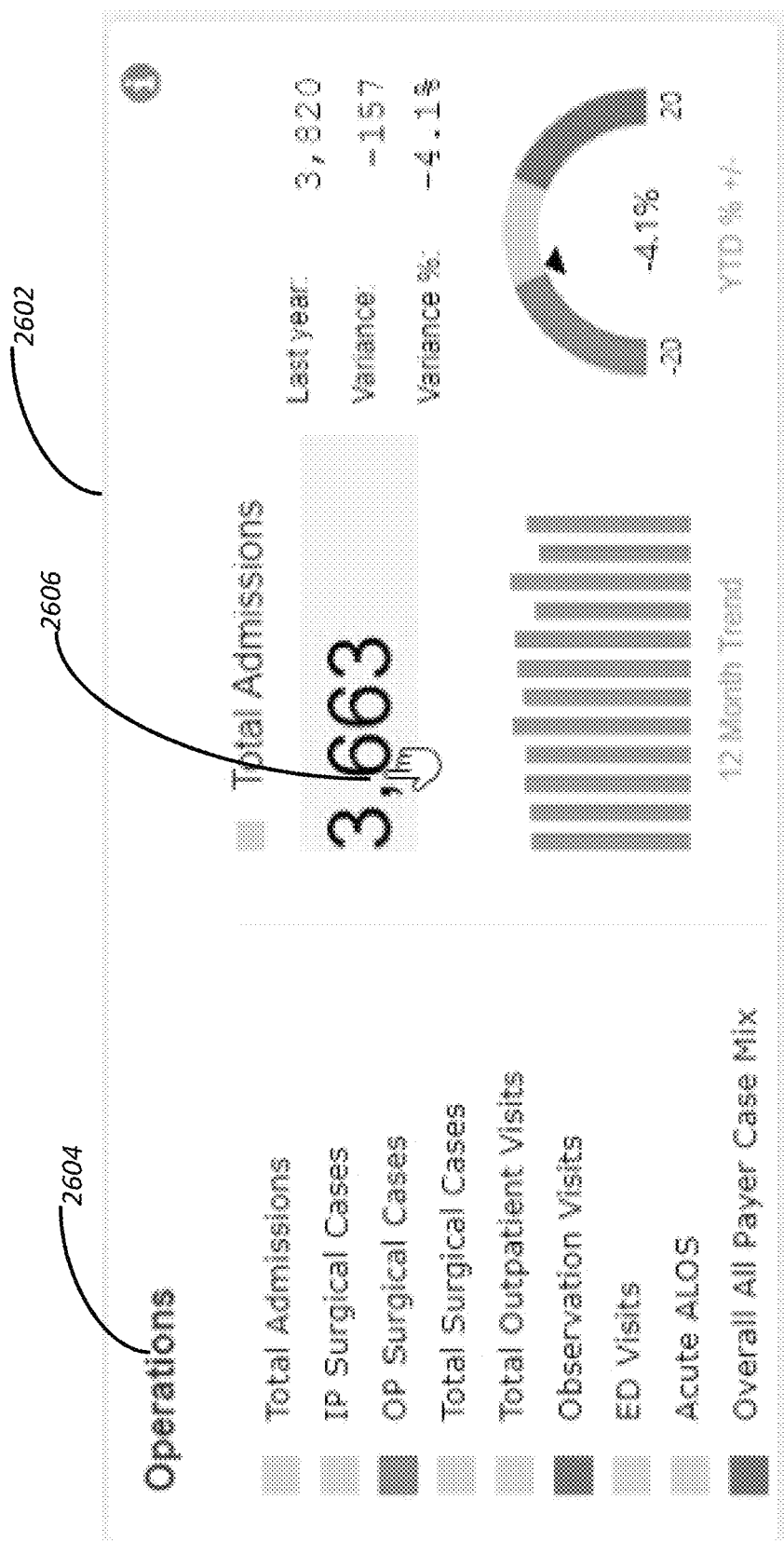
FIG. 26 depicts a portion of the dashboard of FIG. 25.

In embodiments, FIG. 26 depicts one example of how a user may select, through a user interface presented in FIG. 26 a portion of a data set for processing with assisted analytics. In a subset 2602 of user interface 2502, a user may select an entry 2604 that activates an assisted analytics operation to facilitate determining outliers of data that contributes to the selected entry; here the entry selected is a value representing total admissions 2606 over a particular time frame, such as Year to Date and the like.

Figure 27:
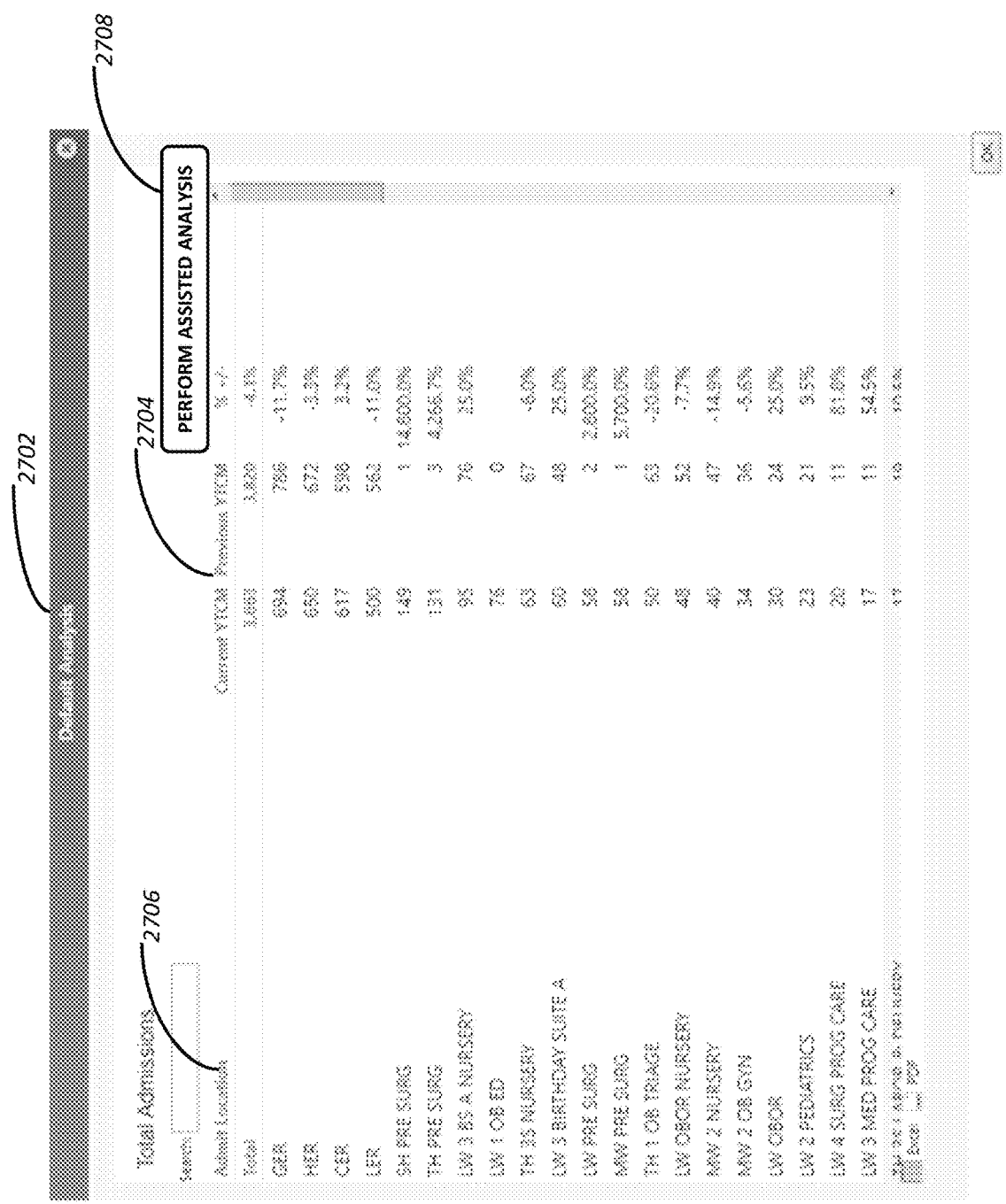
FIG. 27 depicts a user interface in which default analysis of data that is accessible through the dashboard of FIG. 26.

In response to selection of a value 2606 in the dashboard of FIG. 26, a default analysis 2702 may be presented in a new screen as depicted in FIG. 27. In embodiments, such a default analysis 2702 may present any preconfigured sum totaled summaries of the selected value 2606 over a default time frame 2704. In the embodiments represented by the exemplary chart of FIG. 27, total admission 2604 may be separated into individual rows for each type (e.g., location) of admission 2706. The default analysis user interface screen 2702 may facilitate access to further assisted analysis methods and systems, such as assisted analysis that may be activated on the selected/presented data set responsive to selection (user and/or machine-based) of assisted analysis control 2708. While the information presented in default analysis 2702 covers admission location 2706, the information could have covered admitting physician, insurance carrier, zip code of patient, or any other information associated with an admission that contributes to total admissions and the like.

Figure 28:
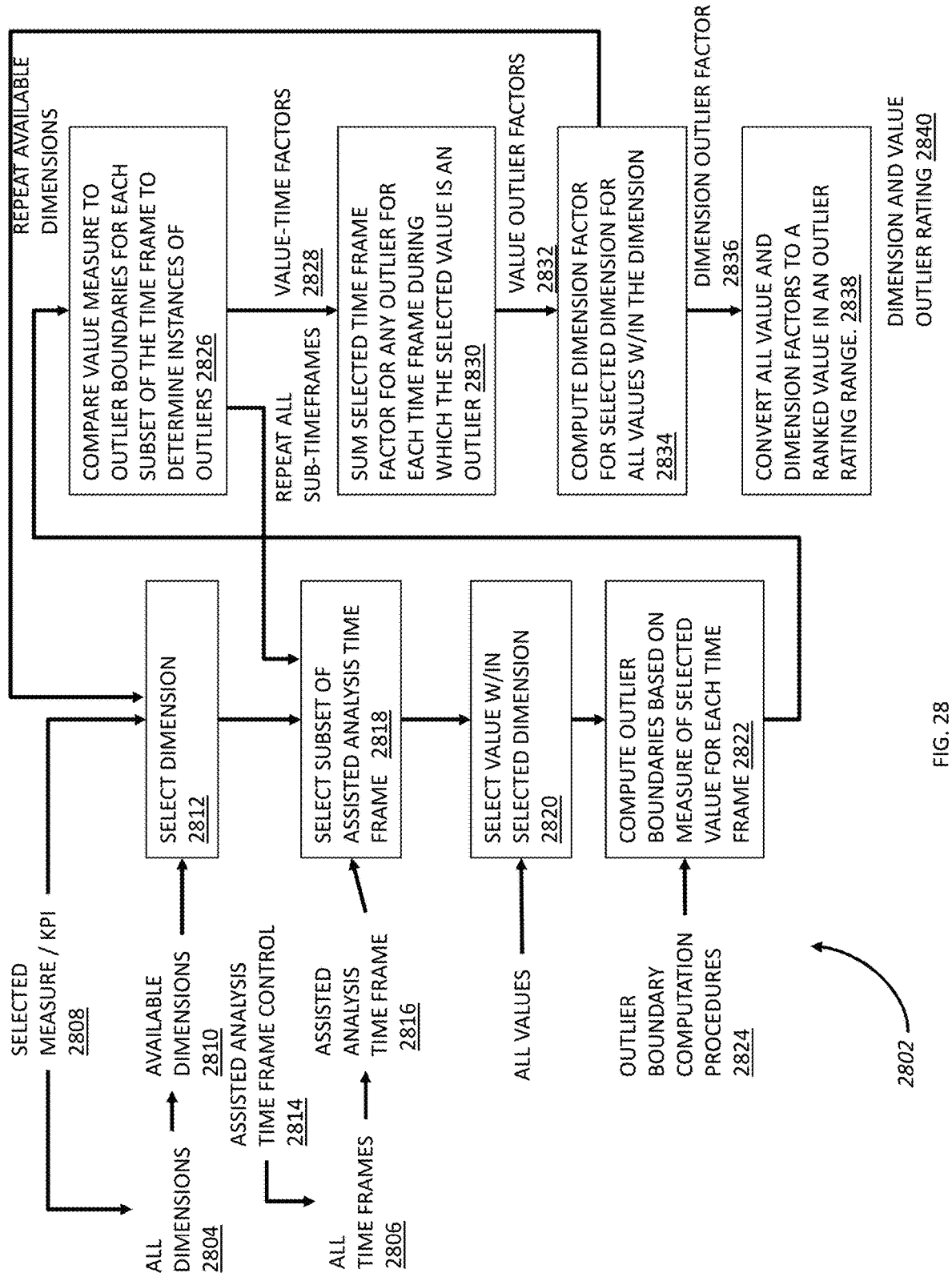
FIG. 28 depicts a method of assisted analytics.

In embodiments, methods and systems of assisted analytics, including without limitation assisted analysis may be responsive to, among other things, selection of the assisted analysis control 2708 through application of the exemplary method depicted in FIG. 28 herein. Processes responsive to selection of the assisted analysis control 2708 may operate on one or more processors, computers, servers, tablets, including combinations thereof for similar or different portions of the processes. These responsive processes, such as 2802 may be configured to perform some functions automatically, using preconfigured or self-taught limits on parameters, such as dimension 2804, time frames 2806, and the like. A selected measure 2808 may be derived from the user selection made in, for example in FIG. 26, such as total admissions 2606, and the like. This selected measure 2808, may be applied to a dimension filtering function that may identify one or more available dimensions 2810 of which one select dimension 2812 would be used for a first loop of assisted analysis 2802. At step 2812 a dimension for assisted analysis is selected.

In embodiments, while the information presented in dashboards 2502 and in default analysis 2702 may be based on a particular time frame (e.g. year to current month 2704), a timeframe for assisted analysis 2702 may be controlled by an assisted analysis time frame control parameter 2814. The assisted analysis timeframe 2816 may be, for example, a most recent 12-month timeframe or any other value that relates to the dimension of data being targeted for assisted analysis. Generally assisted analysis seeks to determine outliers in each of a plurality of prior timeframes. With the selection of a time frame for assisted analysis 2816, a specific one of the plurality of sub time frames is selected 2818. At step 2818 a length of time (sub-timeframe) for assisted analysis is selected. In an example, if the assisted analysis time frame 2816 is a trailing 12 months, then a selected sub-timeframe would be one of the trailing 12 months. Here, the selection of total time frame, and number of sub-timeframes can be user specified and/or determined from the data set being analyzed. In an example, data may be recorded daily, so that sub time frames available may include daily, weekly, monthly, quarterly, bi-annually, annually and the like. A default sub-timeframe (in the exemplary embodiments of FIG. 28 the default is monthly) may be part of an assisted analysis 2802 control matrix. In embodiments, a user may be presented with a plurality of sub-timeframe options to choose among.

In embodiments, values under which data may be collected may be configured on a per-dimension basis. Each value under which data is collected is selected in sequence and a data collected value is retrieved for that dimension value. An exemplary embodiment of a dimension value is represented by admission location 2706 in FIG. 27. At step 2820, a value under which data is collected for the selected dimension is selected.

In embodiments, at step 2822 a statistical computation is performed on the selected dimension/sub-timeframe for all values within the dimension to facilitate determining/learning potential boundaries for detecting outliers. Exemplary computations at this step may include averages, means, standard deviations, control charting, p-value computing, trending analysis and the like. A default statistical computation procedure may be used from a set of procedures 2824. Alternatively, a statistical computation procedure may be selected dynamically based on a data set size, platform or user preferences, prior experience, user ranking, and the like. A desired result of such computation comprises one or more values against which the data in the dimension/sub-timeframe can be compared to determine if each individual entry in the data represents an outlier. In embodiments, when a standard deviation process is employed, one or more standard deviations for the data would be calculated. Any values that fall outside of the computed one or more standard deviations may be deemed to be outliers. Described elsewhere herein are techniques for refining a determination of outlier boundary values, including among other things, adjusting a boundary based on a count of entries that fall outside the boundary. As a non-limiting example, when standard deviation analysis is applied, a second or third order deviation may be calculated and used as an outlier deviation threshold.

In embodiments, machine learning techniques may be applied to facilitate determining useful outlier thresholds. Feedback to machine learning resources that indicate the usefulness of candidate outlier thresholds may be applied when generating subsequent outlier thresholds. Likewise, feedback for different threshold computation procedures may be relied up to facilitate learning which threshold computation procedures provide more useful outlier results.

In embodiments, at step 2826 values for the selected dimension/sub-timeframe/value may be compared to the computed outlier boundary, thereby producing a value-time factor 2828. A time-value factor may be a number that relates the sub-timeframe to an importance of an outlier occurring in that sub-timeframe. As an example, using the most recent 12 months as the collection of sub-timeframes, each month in the collection may be assigned a different time-value factor. The most recent month (e.g., February if the date is between March 1 and March 31) may be weighted with a value of 12, whereas the oldest sub-timeframe (March of the prior year) may be weighted with a value of 1. By outputting and accumulating the value-time factor (e.g., 1, 2, 3, . . . 12 in the monthly example above) for each outlier, old outliers that no longer appear in the data (e.g. transient aberrations that do not reappear) would have less influence on a rating of the outlier than more recent outliers. In this way, each sub-timeframe can be differentiated against the others based on, for example importance. Other weightings, value-time factors and the like are possible and contemplated herein. One example of another weighting may be based on business cycle timing, with periods during peak season being weighted higher than during off-season periods. Another example of other value-time factors may include, outliers for certain dimension values being differently weighted. Outliers for dimension values that represent areas of key focus for performance improvement may be weighted higher (e.g., may have a higher value-time factor) than other performance areas. The step 2826 of comparing data to outlier boundaries may be repeated for each sub-timeframe.

At step 2830 of the method depicted in FIG. 28, each of the value-time factors for all outliers may be summed. The step 2830 may include summing the selected sub-timeframe value-time factor for any outlier for each sub-timeframe during which the selected dimension-value is found to include an outlier. The result may be a dimension-value outlier factor 2832 for each dimension-value across the selected assisted analysis time frame 2816.

At step 2834 of the assisted analysis method 2802, a dimension factor may be computed based on the dimension-value factors 2832 produced at step 2830. In embodiments, a dimension factor 2836 may be computed for a selected dimension (see step 2812) based on all selected dimension-values (see step 2820). This computation may be performed by repeating all steps from selecting a dimension 2812 through generating a dimension outlier factor 2836.

In embodiments, resulting outlier factors, such as value-time factors 2828, dimension-value outlier factors 2832, and dimension outlier factors 2836 may be mapped 2838 against a fixed range of outlier rating, such as range of 1-9, with 1 being the lowest outlier rating and 9 being the highest outlier rating. Any range of outlier rating 2840 and any number of increments in the range may be used and such range and increments are contemplated herein. The range of outlier rating 2840 may be linear, non-linear, non-numerical, and the like. A goal of such mapping may be to facilitate intuitive recognition by a human as to the severity of a given outlier factor. The mapped outlier factors 2838 representing increments in a range of outlier ratings 2840 may facilitate generating a user interface in which outlier ratings for each dimension 2812 and/or dimension-value 2820 are filtered (relative to an outlier rating presentation threshold value) and presented. An exemplary embodiment of such an outlier user interface presentment is depicted in FIG. 29.

Figure 29:
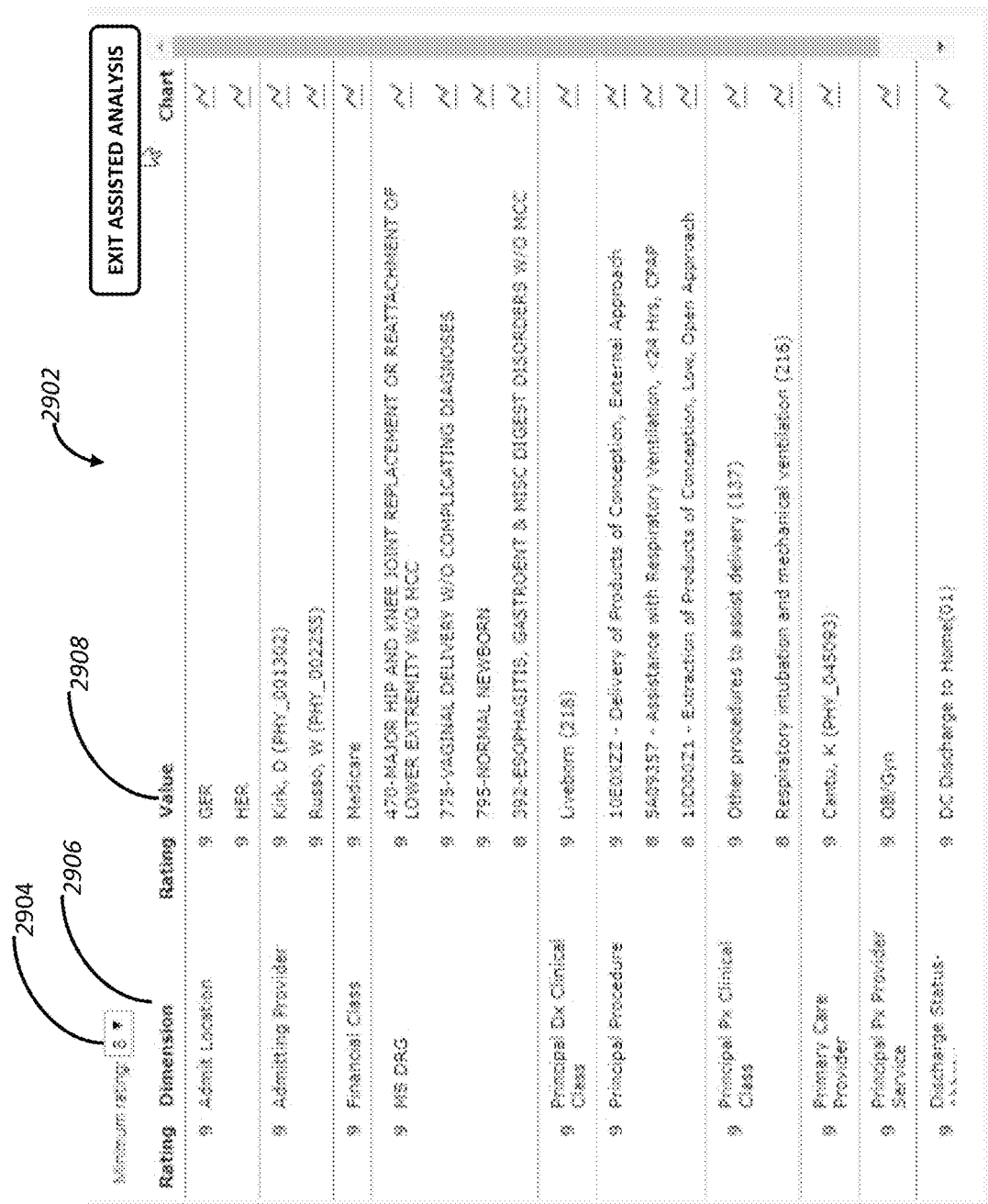
FIG. 29 depicts a user interface in which a result of assisted analytics is presented.

In embodiments, FIG. 29 depicts a user interface screen of a digital computing user interface in which dimensions and dimension-values are rated based on occurrences of outliers using the methods and systems of assisted analysis exemplarily depicted in FIG. 28 and described herein. User interface 2902 includes an outlier rating filter selector 2904 that facilitates a user determining in real-time a minimum value for outlier rating to be presented in the interface 2902.

Figure 30:
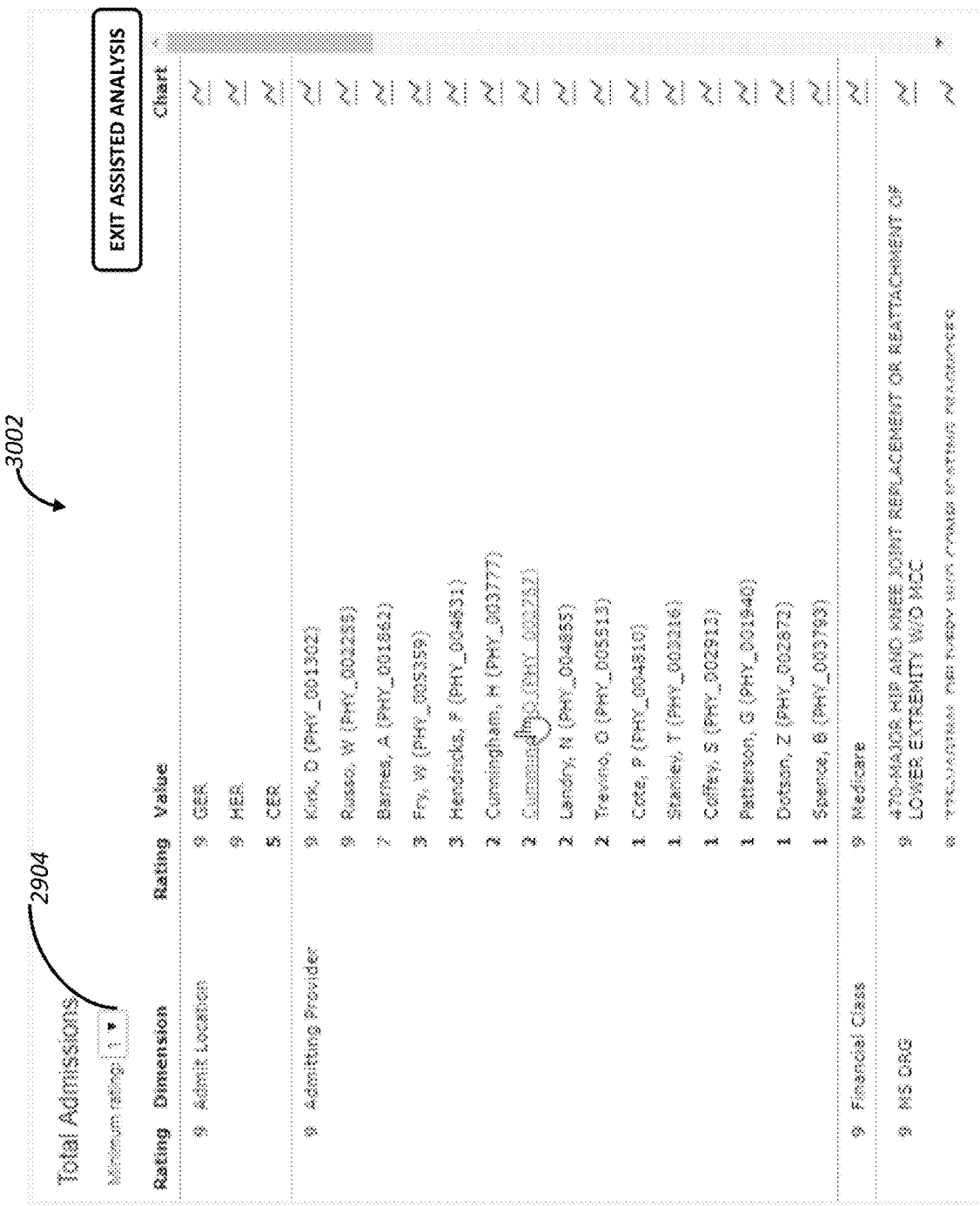
FIG. 30 depicts a variant of the user interface of FIG. 29.

In embodiments, performing assisted analysis, such as through the exemplary method 2802, may next rely on a presentation procedure that may process the resulting dimension and dimension-value outlier ratings and determine an initial filter selector 2904 value that ensures at least a minimum number of dimensions and/or dimension-values are displayed. The outlier filter presentation procedure may further ensure that a maximum number of results are presented, per dimension 2906, per dimension-value 2908 and the like by selecting a minimum outlier rating that reduces the number of results presented. Additional limits may be imposed, such as no more than 4 dimension-value results per dimension independent of the number of dimension-values exceeding the (optionally automatically calculated) presentation procedure filter threshold value. FIG. 30 depicts a variant 3002 of the user interface 2902 wherein the filter selector 2904 has been adjusted from 9 (as shown in FIG. 29) to a filter value of 1. In this variant, all dimension-values with outlier ratings 1 and above are presented in the user interface 3002.

In embodiments, FIG. 31 depicts a user selecting one of the presented dimension-values for further discovery. An exemplary result of such as selection is presented in FIG. 32. Here, the data presented no longer relates directly to the dimension-value outlier rating, but rather places the user back into a specific portion of the original dashboard including presenting data only from the original time-frame (e.g., year to current month) for the particular dimension value (here, physician Dr. D. Kirk). The user interface of FIG. 32, now focused solely on admitting provider D Kirk may facilitate further assisted analysis. Through selection of the assisted analysis control 3202, assisted analysis, such as the assisted analysis method 2802 of FIG. 28 may be performed on the subset of entries in the source data set for which D Kirk was the admitting provider.

Figure 32:
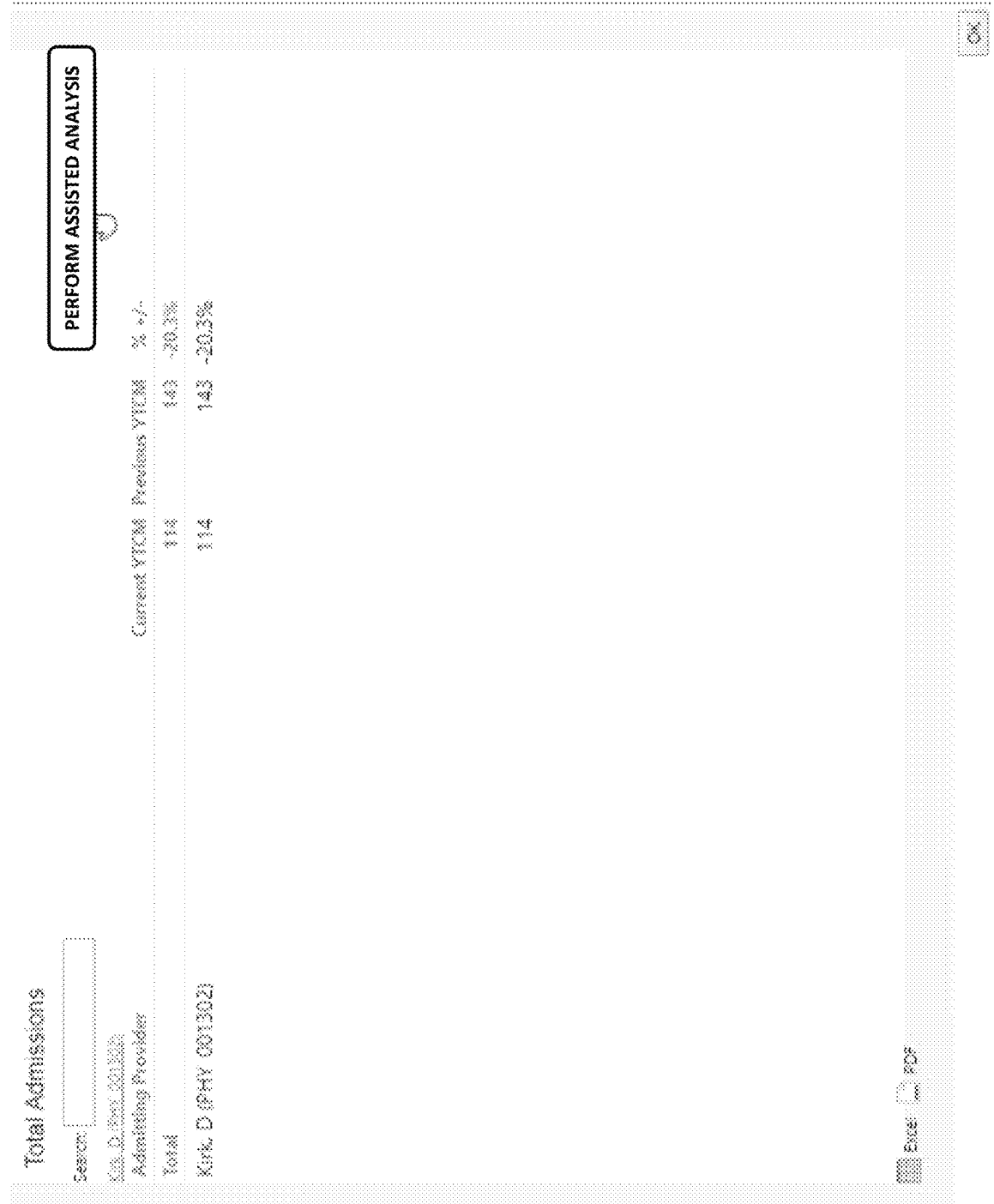
FIG. 32 depicts a result of the selection of a dimension-value in FIG. 31.
Figure 33:
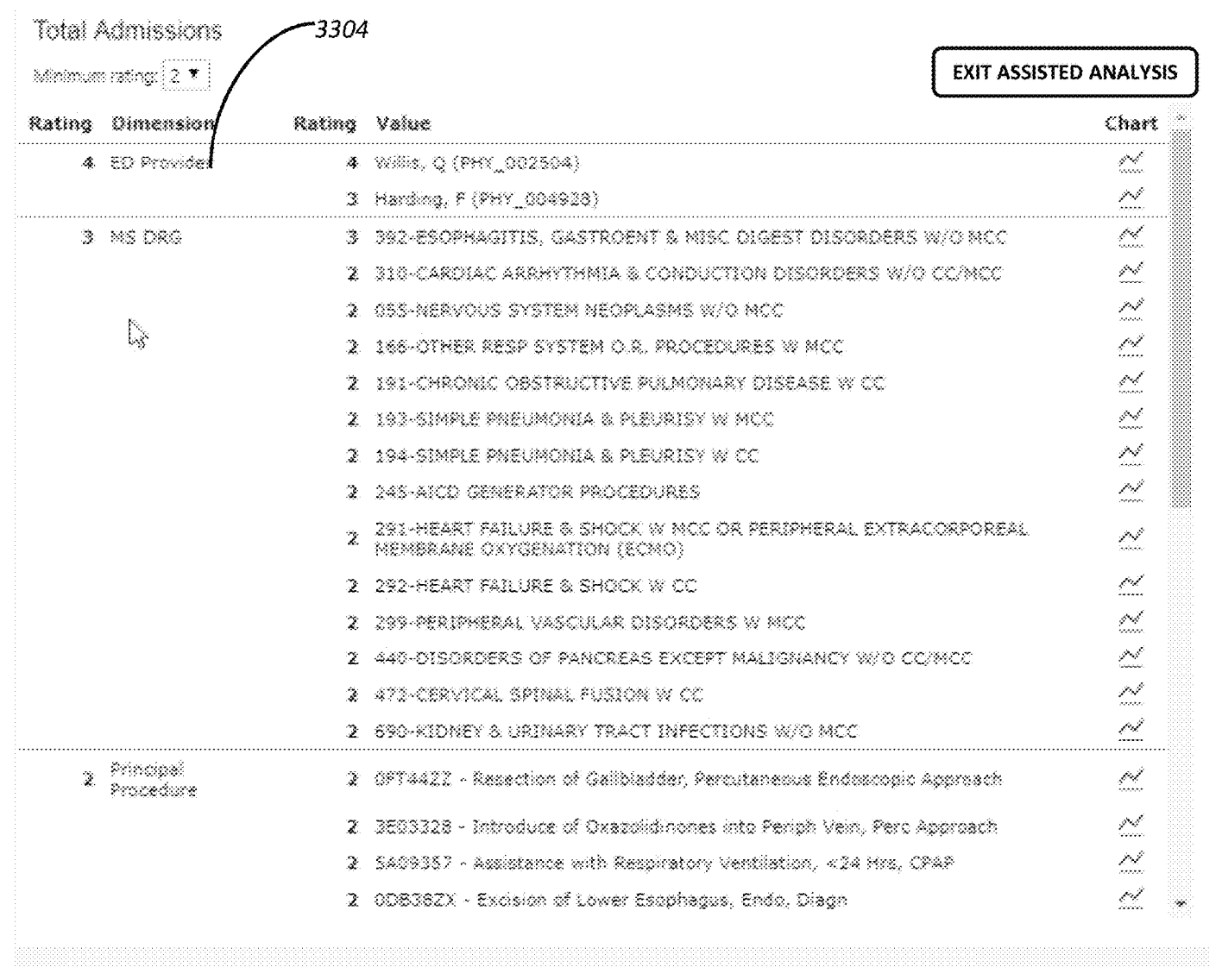

In embodiments, a result of assisted analysis performed on the data of FIG. 32 (total admissions for admitting physician D Kirk) is presented in the user interface of FIG. 33. This user interface has comparable features, layout, and controls as the assisted analysis user interface 2902 of FIG. 29. Based on the assisted analysis performed on this data, a rating filter threshold computation procedure initially selected a filter value of 2 for presenting the results. If, for example a default value greater than 4 was chosen, no outliers would be visible in this report.

Figure 34:
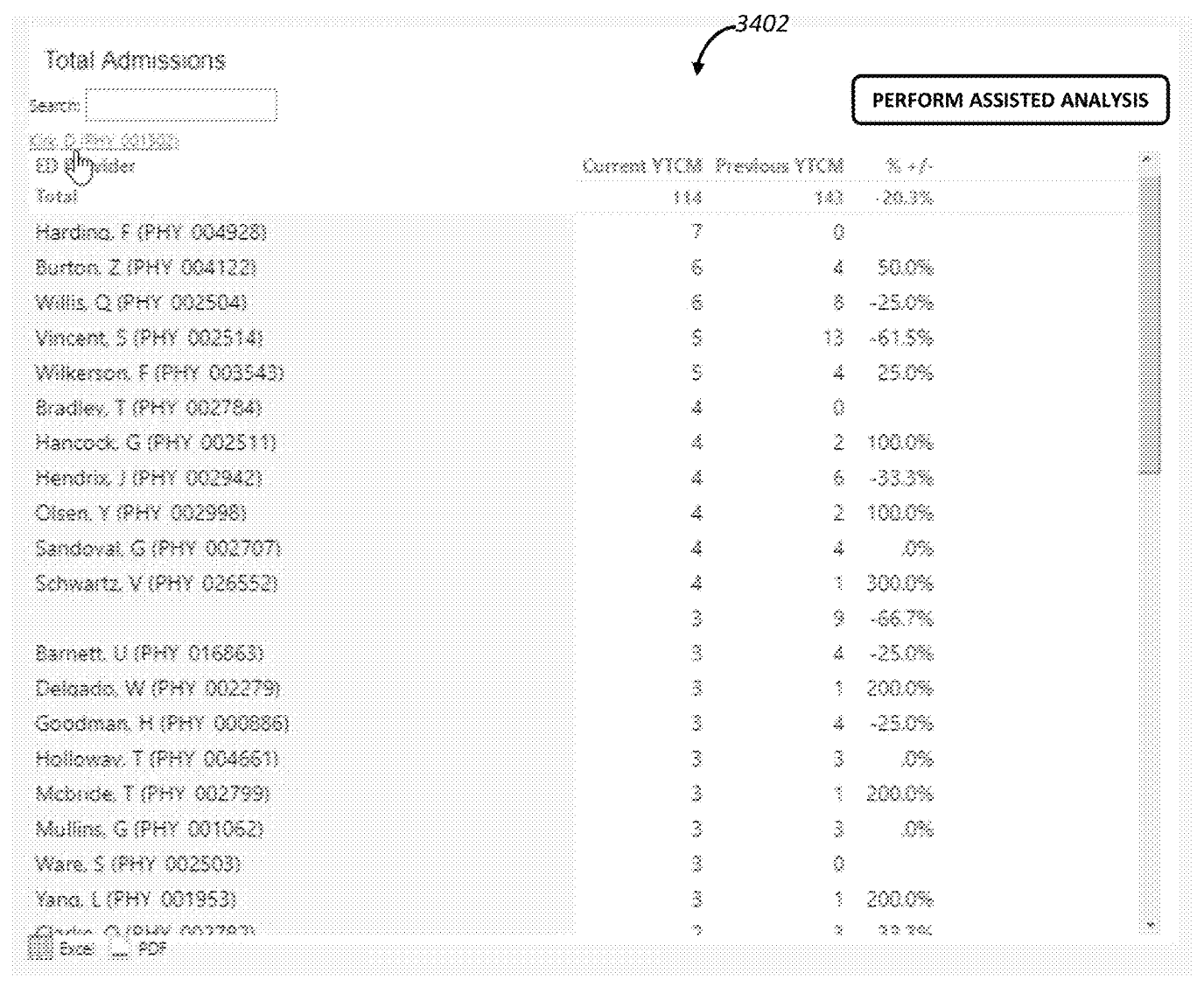

Referring to FIG. 34, a default analysis of an Emergency Department provider subset of total admissions for which D Kirk was the admitting physician is presented. This interface 3402 may be based on a selection of ED Provider (3304) in the prior assisted analysis results screen. By selecting ED provider, 3304 a list of ED providers who contribute to D Kirk's admissions may be presented. When the order of ED providers in FIG. 34 is compared to the list of outliers in FIG. 33, it is notable that while the first ED provider in FIG. 34 (Harding) and the third such provider (Willis) are flagged as outliers. Whereas ED provider Burton has as many or nearly as many contributions to physician D Kirk admissions (6 versus 6 for Willis and 7 for Harding) he does not appear as a rated outlier in the outlier analysis of FIG. 33. Either piece of information alone (assisted analysis of FIG. 33 and ED provider details for D Kirk admissions) may be insufficient to determine a best course of action. Together the two pieces of information suggest possible actions, such as determining if ED provider Burton may use a procedure that is more resistant to contributing to outlier occurrences than either Harding or Willis.

The methods and systems of assisted analytics, including without limitation assisted analysis 2802 and the like may be integrated with or into a measure factory as may be described and depicted in figures filed with the documents incorporated herein. In embodiments, intermediate measure factory processing tables may be accessed by the assisted analysis methods and systems described herein to improve processing efficiency, thereby improving the functionality of a computer executing assisted analysis and the like. By accessing intermediate files produced by the measure factory, fewer computing cycles, fewer network transactions, and fewer memory accesses (e.g., accesses to the large database from which the measure factory tables are produced) result.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some device or all devices may facilitate parallel processing of a program or method at one or more location without deviating from the scope of the disclosure. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or another communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A system comprising:
   at least one processor; and
   a memory device storing an application that adapts the at least one processor to:
      compute, for each of a plurality of assisted analytics time frames, a dimension data value outlier boundary by applying statistical analysis to at least a portion of data organized by a dimension data value selected by a user;
      compute, for each of the plurality of assisted analytics time frames, a time-value factor;
      detect at least two of the plurality of assisted analytic time frames that include a data value that is organized by the dimension data value selected by the user, and used to produce a measure of business performance data, that is outside of the dimension data value outlier boundary;
      aggregate the time-value factors corresponding to each of the detected at least two assisted analytics time frames, the aggregating producing a dimension data value outlier factor;
      generate one or more dimension outlier factors based at least in part on the dimension data value outlier factor; derived from the detected at least two assisted analytics time frames; and
      map the one or more dimension outlier factors to a corresponding rating value, the mapping structured to facilitate user-controllable visualization in an electronic interface of an impact of each dimension in a subset of dimensions of one or more business processes represented by the measure of business performance data.

2. The system of claim 1, wherein the application further adapts the at least one processor to compute, for each of the plurality of assisted analytics time frames, the dimension data value outlier boundary via machine learning.

3. The system of claim 1, wherein the application further adapts the at least one processor to apply the statistical analysis to at least a portion of the data organized under the dimension data value by calculating a standard deviation of data entries organized by the dimension data value.

4. The system of claim 3, wherein the dimension data value outlier boundary is computed via application of a multiple of the standard deviation.

5. The system of claim 1, wherein the application further adapts the at least one processor to apply the statistical analysis to at least a portion of the data organized under the dimension data value by dynamically determining the statistical analysis.

6. The system of claim 1, wherein the application further adapts the at least one processor to dynamically determine the statistical analysis based on at least one of: a size of a data structure containing the business performance data;
   a user preference;
   a previously used statistical analysis;
   or a user ranking of the statistical analysis.

7. The system of claim 1, wherein the application further adapts the at least one processor to dynamically determine the statistical analysis based at least in part on a count of data entries that are outside of the dimension data value outlier boundary.

8. A computer implemented method comprising:
computing with a processor, for each of a plurality of assisted analytics time frames, a dimension data value outlier boundary by applying statistical analysis to at least a portion of data organized by a dimension data value selected by a user;
computing with the processor, for each of the plurality of assisted analytics time frames, a time-value factor;
detecting with the processor, at least two of the plurality of assisted analytic time frames that include a data value that is organized by the dimension data value selected by the user, and used to produce a measure of business performance data, that is outside of the dimension data value outlier boundary;
aggregating with the processor the time-value factors corresponding to each of the detected at least two assisted analytics time frames, the aggregating producing a dimension data value outlier factor;
generating one or more dimension outlier factors based at least in part on the dimension data value outlier factor derived from the detected at least two assisted analytics time frames; and
mapping with the processor, the one or more dimension outlier factors to a corresponding rating value, the mapping structured to facilitate user-controllable visualization in an electronic interface of an impact of each dimension in a subset of dimensions of one or more business processes represented by the measure of business performance data.

9. The method of claim 8, wherein applying statistical analysis to at least a portion of data organized by the dimension data value is based at least in part on machine learning.

10. The method of claim 9, wherein applying statistical analysis to at least a portion of data organized by the dimension data value comprises: calculating a standard deviation of data entries organized by the dimension data value.

11. The method of claim 10, wherein computing, for each of a plurality of assisted analytics time frames, a dimension data value outlier boundary comprises: applying a multiple of the standard deviation.

12. The method of claim 8, wherein applying statistical analysis to at least a portion of data organized by the dimension data value comprises:
dynamically determining the statistical analysis.

13. The method of claim 8, wherein dynamically determining the statistical analysis is based at least in part on of:
a size of a data structure containing the business performance data;
a user preference;
a previously used statistical analysis;
or a user ranking of the statistical analysis.

14. The method of claim 8, wherein dynamically determining the statistical analysis is based at least in part on a count of data entries that are outside of the dimension data value outlier boundary.

15. A system comprising:
at least one processor; and
a memory device storing an application that adapts the at least one processor to:
determine, responsive to a user selecting a business performance measure, a subset of dimensions of a plurality of dimensions of business performance data based at least in part on a correspondence of the subset of dimensions to data used to produce the business performance measure;
determine a first dimension of the subset of dimensions;
configure an assisted analytics set of time frames used to produce the business performance measure and associated with the first dimension;
select a dimension data value, of a plurality of dimension data values that organize data corresponding to the first dimension;
compute, for each assisted analytics time frame in the assisted analytics set of time frames, a dimension data value outlier boundary by applying statistical analysis to at least a portion of the data organized by the dimension data value;
compute, for each time frame in the assisted analytics set of time frames, a time-value factor based on one or more of: a recency of the time frame, a business cycle, or an importance of the dimension data value to a focus of business performance;
detect one or more of the time frames, in the assisted analytics set of time frames, that include at least one data value organized by the dimension data value that is used to produce a measure of business performance data and that is outside of the dimension data value outlier boundary;
aggregate the time-value factors of the corresponding one or more time frames, the aggregating producing a dimension data value outlier factor;
produce a dimension outlier factor for each dimension in the subset of dimensions by aggregating a dimension data value outlier factor across the plurality of dimension data values for each of the dimensions in the subset of dimensions; and
map each dimension outlier factor to a corresponding rating value in a closed end scale of dimension outlier factor ratings, the mapping structured to facilitate user-controllable visualization in an electronic interface of an impact of each dimension in the subset of dimensions on one or more business processes represented by the measure of business performance data.

16. The system of claim 15, wherein the application further adapts the at least one processor to compute, for each assisted analytics time frame in the assisted analytics set of time frames, the dimension data value outlier boundary via a machine learning system that distinguishes among a plurality of candidate outlier boundary values based on feedback indicative of usefulness of a candidate outlier boundary.

17. The system of claim 15, wherein the application further adapts the at least one processor to apply the statistical analysis to at least a portion of the data organized under the dimension data value by calculating a standard deviation of the portion of data entries organized under the dimension data value.

18. The system of claim 17, wherein the dimension data value outlier boundary is computed via application of a multiple of the standard deviation.

19. The system of claim 15, wherein the application further adapts the at least one processor to apply the statistical analysis to at least a portion of the data organized under the dimension data value by dynamically determining the statistical analysis based on at least one of a size of a data structure containing the business performance data, a user preference, a previously used statistical analysis, or a user ranking of the statistical analysis.

20. The system of claim 15, wherein the application further adapts the at least one processor to apply the statistical analysis to at least a portion of the data organized under the dimension data value by dynamically determining the statistical analysis based a count of data entries that are outside of the dimension data value outlier boundary.

* * * * *